April 26, 1966     WEI MING SHIH     3,248,692
COMBINED COMPARATOR AND PARITY CHECKER
Filed March 24, 1961     5 Sheets-Sheet 4

INVENTOR.
WEI MING SHIH
BY
J. Donald Weber, Jr.
AGENT

April 26, 1966   WEI MING SHIH   3,248,692
COMBINED COMPARATOR AND PARITY CHECKER
Filed March 24, 1961   5 Sheets-Sheet 4

INVENTOR.
WEI MING SHIH
BY
J. Donald Weber, Jr.
AGENT

United States Patent Office 3,248,692
Patented Apr. 26, 1966

3,248,692
COMBINED COMPARATOR AND PARITY CHECKER
Wei Ming Shih, Flourtown, Pa., assignor to Sperry Rand Corporation, New York, N.Y., a corporation of Delaware
Filed Mar. 24, 1961, Ser. No. 98,106
12 Claims. (Cl. 340—146.1)

This invention relates to a circuit for checking the correctness of coded information. In particular, the circuit compares information in an odd-parity bi-quinary code from one source with information in an odd-parity bi-quinary code from another source, and performs an ODD-EVEN check of the information which results from the comparison of the aforesaid coded information.

Many computing machines utilize coded information in order to facilitate their operations. Thus, information is fed into the computer in the form of a binary code or the like. This information is then operated upon in accordance with the instructions given to the computer by the program which is set-up in the machine. After the program has been followed and the various routines and sub-routines have been gone through, the computer has the output information in its memory circuit, for example, ready to be utilized by the operator of the computer. However, this information is in the form of coded information which is, of course, awkward for ready utilization by human operators of the computers.

In order to obtain a useful output from the computer it is advantageous to have this information printed by peripheral printing equipment. Therefore, many computing machines have associated therewith peripheral printing equipment which prints the output data of the machine. This printing equipment often includes a code drum which is associated with a print wheel, which has thereon the symbols which are to be printed. For purposes of convenient synchronization, the code drum and the print wheel may be mounted on a common revolving axis. Thus, when a particular symbol on the print wheel, e.g., a number, a letter, or the like, is in position to be printed, the code drum presents coded information thereby identifying this particular symbol. The information identifying each symbol may be represented by a suitable code representation, as for example, binary, bi-quinary, etc. In one type of equipment, the symbol representation on the code drum may be in the form of magnetic "spots" which are "read" by a magnetic transducer. Other types of similar equipment are known and reference is made to "High Speed Printer," by E. E. Masterson and J. P. Eckert, Jr., Serial No. 486,206, now U.S. Patent No. 2,978,977. When this code representation on the code drum is sensed by suitable sensing means, the machine then "knows" that the particular symbol is in the position to be printed.

A comparator circuit connected to the printing mechanism is interposed between the code drum and the memory circuit and is adapted to receive the separate information signals produced by each of these devices and to compare this information bit-by-bit to determine whether or not the signals are identical. Where there is an identity between the coded information signals received from both the code drum and the memory circuit, an output signal is produced which essentially controls the printing operation. Conversely, if an identity between the said information does not appear, the output signal, or lack thereof, may be interpreted either as indicating that the information signal which is instantaneously presented by the memory is not identical to the signal which is representative of the symbol presently in position to be printed, or that there is an error in the information presented by one of the above-mentioned sources. The identity (or lack thereof) may be ascertained by gating together the coded information signals from the code drum and memory in a bit-by-bit fashion such that a particular signal will be produced for each identity between various bits. For example, when two identical signals are compared (gated together) the output signal may be represented by a binary "one." Conversely, the identity may be represented by a binary "zero."

Thus, when two coded information signals or digits (one from the code drum and one from the memory) are gated together, a resultant digit called the comparison digit, for example, is produced. The comparison digit comprises then, (1) binary ones, which are representative of the identities and (2) binary zeroes, which are representative of the non-identitites in the two digits of information which are being compared. It may be seen that this operation permits the use of different information codes in the several equipments used in a computing machine since it is the identity (or lack thereof) which determines the contents of the comparison digits.

The comparison digits are then fed to a parity checker, which gates together various combinations of the several bits of information produced by the comparator. The output signal which is produced by this gating operation is representative of the parity (ODD or EVEN) of the information digit produced by the comparator. That is, as in the preferred embodiment, an output signal may be produced when there are odd number of binary ones in the digit produced by the comparison, or conversely, the output signal from the parity checker may be used to indicate an even parity i.e., an even number of ones in the digit produced by the comparator. Furthermore, the parity, either ODD or EVEN, may be indicated by the absence of a signal at the output of the parity checker. Clearly, according to the convention preferred, the signals produced may be used to designate the system information in any manner.

This invention provides the checking of the parity of an output signal from the comparator by a single parity checker instead of individually checking the parity of each of the signals from the code drum and from the memory. Consequently, one object of this invention is to compare coded signals produced by the arithmetic sections of a computing machine with the coded signals produced by a code drum.

Another object of the invention is to provide a comparison circuit which will operate on both parallel and serial supplied information.

A further object of the invention is to provide an integrated comparison circuit and parity checking circuit.

Yet another object of the invention is to provide a single parity checker circuit which operates in accordance with signals produced by the comparison circuit.

Still another object of the invention is to provide a single parity checking circuit which effectively checks the parity of signals produced by two separate information sources.

A still further object of the invention is to provide a combined comparator and parity checker which utilizes fewer components.

These and other advantages will become more readily apparent by reading the following description of the invention in conjunction with the drawings, in which.

INTRODUCTORY MATERIAL

Figure 1:
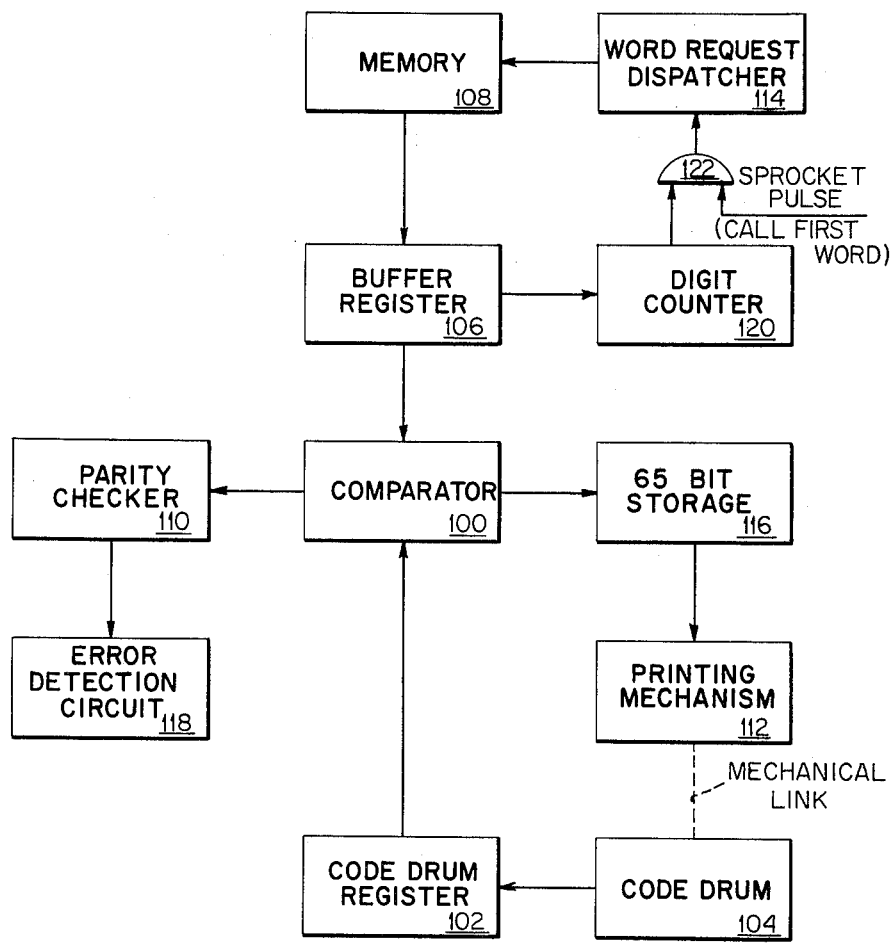
FIGURE 1 is a simplified block diagram of a system utilizing the instant combined comparator and parity checker, which has been separated for convenience of description.

The combined comparator and parity checker which is the subject of the invention is designed to operate on information having ODD parity. In addition, the subject circuit is capable of several modes of operation. For convenience, these modes will be referred to as the numeric and the alphameric modes. The distinction between the different modes resides in the number and type of symbols which are included in each of the modes. For example, the numeric mode will include the numbers 0–9 inclusive and perhaps several arithmetic and editing symbols; whereas the alphameric mode will include not only the numerals and arithmetic symbols but also the alphabetic letters A–Z, some editing and grammatical symbols, and perhaps some Greek letters or the like.

In a preferred embodiment, the typewheel will include 51 characters for printing. These characters include the 10 numerals, 0–9; the 26 alphabet letters, A–Z; and 15 other assorted symbols and Greek letters. These 51 characters may each be represented by a 9 bit binary code digit comprising a check bit (bit number 9); a four bit Least Significant Digit (bits number 1–4); and a four bit Most Significant Digit (bits number 5–8). In this embodiment, operation in either the numeric or the alphameric mode is possible. The operation in one or the other mode may be controlled by a mode control register (not shown), which may be set in accordance with the program which the computer is to follow.

In the numeric mode, all of the numeric symbols and a number of mathematical symbols are designated by a code which utilizes bits in the binary form. Since there are a minimum of 10 symbols to be represented in this mode of operation, a digit having 5 binary bits is required in order to represent all of the symbols in the computing machine with ODD parity. In addition, it may be noted that as many as 16 symbols may be represented by digits comprising 5 bits and having the required ODD parity. This is easily seen by taking $2^5=32$ (the number of combinations of 5 bits having 2 possible values), and eliminating the EVEN parity combinations leaving 16 possible different arrays of binary symbols which have ODD parity.

In the alphameric mode, on the other hand, each symbol or character is represented in the computing machine by two of the aforementioned 5 bit digits in series. This serial representation is required since there are 51 different characters to be considered, as previously noted. Because of the number of characters being utilized the previously used 5-bit digit of the numeric mode of operation is not sufficient. That is, the combinations and permutations of binary ones and zeros having ODD parity are limited, and a larger character representation is required, for example a seven bit digit. However, since the memory and computing system have been designed for 5-bit digits, a simple arrangement can be made possible whereby two 5-bit digits are read into the comparator in series. This arrangement permits the production of a very large number of coded digit with ODD parity. Clearly, these are more code possibilities than are required but those unneeded digits are ignored.

The code arrangement utilized in this device uses a binary form. That is, the bits comprise ones and zeros. In the preferred embodiment, the binary ones are represented by low level signals and the binary zeros are represented by high level signals. Of course, this condition could be reversed but then the logic operation of the device and/or the operation of many of the circuit components would require revision.

The operation of various components is easily understood. For example, the gates in the system produce output signals in response to the polarity or level of the input signals applied thereto. Accordingly, if a gate has one or more high level (or binary zero) input signals applied thereto, a low level (or binary one) output signal is produce thereby. Conversely, when *all* of the input signals supplied to a particular gate are low level (binary one) signals, a high level (binary zero) output signal is produced. This operation is followed by all of the gates in the circuit. These gates may be of any type which operates as suggested; however, in the preferred embodiment, they are transistorized gates.

Other circuit components are the pulseformer flip-flops. Basically, the important facet of operation is that the flip-flop will produce two output signals for each input signal. More specifically, the pulseformer flip-flop has two output terminals at which different (complementary) signals are produced simultaneously. One of these signals is the same as the input signal, the other signal is the complement of the first output signal and the input signal.

Further information may be determined by so constructing the flip-flop circuits that an input signal produces the complement thereof at a first output terminal and reproduces the input signal at a second output terminal. Thus, this same device will, for a high level input signal for example, produce the complement thereof (a low level signal) at the second output terminal and will reproduce the high level signal at the first output terminal. In the event of application of a low level input signal, the high level complement signal is again produced at the second output terminal and the low level signal is reproduced at the first output terminal. Thus, it may be seen that both the real and the complement signal may be generated by a pulseformer flip-flop by the application of a single signal. Again, this component may be of any type which may be known, but in the preferred embodiment a transistorized circuit is utilized.

The basic building blocks of the subject invention have been briefly defined. A description of the circuit itself is now presented.

*General description of system*

Referring now to FIGURE 1, an input to the comparator 100 is connected to an output of code drum register 102. Code drum register 102, in turn, has its input connected to the output of printer code drum 104. Another input to comparator 100 is connected to an output of memory buffer register 106 which, in turn, has its input connected to the output of memory 108. Word request dispatcher 114 is connected in series with gate 122 and digit counter 120 between the buffer register 106 and the memory 108. The input of parity checker 110 is connected to one output of comparator 100, and the output of the parity checker 110 is connected to the error detection circuit 118. Another output of comparator 100 is connected to printing mechanism 112 via the 65 bit storage 116. In addition, a mechanical link is shown connecting code drum 104 and printer 112. This mechanical link may actually be a common axle on which are mounted code drum 104 and a typewheel (not shown).

High speed printers are known in the art. In one such printer, the code drum 104 may be, for example, a magnetic disc which has on its surface, a plurality of magnetic indicia. Each of these indicia corresponds to a different symbol on the surface of the typewheel which is located in printing mechanism 112. As the typewheel and the code drum 104 rotate, different ones of the symbols on the typewheel move successively into position to be printed by the printing mechanism 112. In one embodiment of the invention, the printing may be done on a sheet of paper which moves past a printing location which is adjacent to the typewheel in the printing mechanism 112.

As the symbol on the typewheel faces the printing location adjacent the sheet of paper, the coded signal is read from code drum 104, for example by a magnetic transducer. This signal, or group of signals, is translated into a digit comprising nine binary "ones" or "zeros," for example. (Other binary bits may be produced for control purposes but these bits are unimportant for this description.) These binary coded bits are then fed to initial storage flip-flops in coded drum register 102. With the application of a control signal the nine bits are transferred to final storage flip-flops in the code drum register 102. The final storage flip-flops then produce these nine bits and, in addition, the nine complementary bits which then pass from the drum register 102 to the comparator 100. The 18 bits produced by the final storage flip-flops are maintained by these flip-flops (while the initial flip-flops are reset) until the comparisons with the signals from the buffer register 106 are completed by comparator 100.

The buffer register 106 acts as a storage circuit for receiving information in the form of binary "ones" or "zeroes" from the memory 108. The memory 108 may comprise any type of information storage system as, for example, magnetic drums, magnetic tapes and/or magnetic core matrices. In the preferred embodiment, the memory 108 comprises a coincident-current magnetic-core storage system having 60 matrices, with each matrix having a 50 by 50 core arrangement. Thus, it is possible to store $50 \times 50 \times 60$ or 150,000 binary bits of information. This information, in fact, is stored in the form of 2500 ($50 \times 50$) words, each of which comprises 60 binary bits. Each of the words comprises 12 digits having 5 binary bits each. Moreover, the 60 bit word consists of a single bit (magnetic core) in each of the core matrices. Clearly, for convenience each of the bits in a common word has the same X and Y axis notation. Therefore, by pulsing, in the usual manner, the desired X and Y drivers of any known type on each matrix, a 60 bit word is read out, in parallel on the sense windings at the respective core matrices. Reference is made to the copending application of W. J. Bartik and J. S. Jackson, for "Circuit Mounting Assembly," Patent 3,221,285 for further explanation of this type of storage system.

When the storage system of memory 108 is pulsed, as suggested, a 60 bit word of information is transferred to the buffer register 106. It should be noted that in some systems, all of the bits need not be read into the buffer register 106. The number of actual transfers may depend on the mode of operation (numeric or alphameric) of the system. Furthermore, the printing mechanism 112 may utilize alternate-row-notation of printing as described in the copending application of J. P. Eckert, Jr., and E. E. Masterson, noted supra. However, the number of transfers is not critical and for the purpose of this description it is assumed that there are, in fact, 60 actual bit transfers from memory 108 to buffer register 106. Moreover, it is to be noted that these transfers are made in parallel.

That the number of actual transfers made between memory 108 and buffer register 106 is immaterial will be better understood in view of the transfer of bits from the buffer register 106. That is, the 60 bits are read out of buffer register 106 in series-parallel arrangement. In particular, the information of each word is transferred as a series of 12 digits each comprising five bits in parallel. Moreover, the buffer register 106, like the code drum register 102, employs a group of pulseformers at the output thereof whereby the complements of the input signals are produced in addition to the reproduction of the input signals. These ten bits (including complements) are applied to an input of comparator 100 and compared with the bits supplied thereto by code drum register 102 as described above. Moreover, as more fully described infra, the comparison is dependent upon the mode of operation. Thus, in the numeric mode of operation, a single 5-bit digit (plus complements) is supplied to comparator 100 by buffer register 106 to be compared with certain of the 18 bits (including complements) supplied by the code drum register 102. In the alphameric mode of operation, however, two 5-bit digits (and complements) are supplied, in series, to the comparator 100 by buffer register 106 in order to be compared with certain of the 18 bits supplied by code drum register 102. This operation will be explained in more detail subsequently.

Thus, the registers 106 and 102 provide an intermediate storage for signals from the memory circuit 108 and code drum 104, respectively. When the registers 102 and 106 are full, control signals will permit these registers to discharge their information into comparator 100, where the information will be compared on a bit-by-bit basis as will be described in detail subsequently.

The control signal which permits the transfer of information from the code drum register 102 to comparator 100 may be produced by a sprocket pulse from code drum 104 in conjunction with a skew-correcting synchronizer not shown. This sprocket pulse may be contained within the symbol indicia on the code drum 104 (as suggested supra) and produced at each sensing thereof. In the case of alternate-row notation, the sprocket pulse may actually be produced twice for each code drum symbol sensing. However, the control signal which directs the operation of the buffer register is somewhat more complex. To initiate the operation, it being assumed that the printing mechanism 112 is synchronized with code drum 104, a synchronized control (sprocket) pulse is applied to word request dispatcher 114 via gate 122 thereby to set the word request dispatcher flip-flop. Word request dispatcher 114 then selects the address in the memory circuit 108 wherein the desried word is located. A more detailed account of the operation of the dispatcher, per se, is found in the copending application for Digital Computing System, by H. F. Welch et al., Serial No. 98,148, filed on March 24, 1961.

When the dispatcher 114 addresses the memory 108, the word in the selected address is transferred to the buffer register 106 in preparation for being transferred to the comparator 100. Another control signal, which may be derived from the sprocket pulse and associated skew-correcting synchronizer, pulses the buffer register 106 whereupon the information therein is passed to the comparator 100 digit-by-digit.

As each digit is stepped from buffer register 106, a flip-flop in the digit counter 120 is set or reset. In order to count 12 digits, four bistable flip-flops are required. That is, various combinations of the four flip-flops in one of the two possible states may be used to indicate the number of digits which have been transferred. When the digit counter reaches a particular count or condition, in reading out the buffer register 106, it produces an output signal which is fed to word request dispatcher 114 via gate 122. This signal sets the word request flip-flop in order to resume the cycle of obtaining a word from memory 108 for comparison. Thus, the printing control operation will be continued until an End-of-Line or End-of-Print signal is produced by circuitry external to the instant invention. It may be noted that the particular count at which the word request flip-flop is set may be varied according to the speed of operation required. That is, in relatively slow operation, the word request flip-flop may not be set until all 12 digits have been transferred by the buffer register 106. On the other hand, to obtain faster operation an "overlap" system may be used. That is, the word request flip-flop may be set by a signal produced when the digit counter has counted, for example, eight transfers. The amount of "overlap" is clearly dependent upon the relative speeds of the word request dispatcher 114 and the buffer register 106 insofar as word request dispatcher 114 cannot pass information into the buffer register until the latter is actually clear of previous information.

Thus, information in the form of binary bits is fed into comparator 100 by code drum register 102 and buffer register 106. This information is in the form of (1) a 5-bit digit (plus complements) from the buffer register and (2) a 9-bit digit (plus complements) from the code drum register. Clearly, there cannot be a bit-by-bit comparison of an unequal number of bits (viz. 10 bits opposed to 18 bits). Therefore, the 5 bits supplied by the buffer register are compared with certain predescribed ones of the bits supplied by the code drum register. For example, in the numeric mode of operation the 5 bits are compared with bits 1–4 and 9 supplied by the code drum register 102. In the two digit or alphameric mode, on the other hand, the first 5-bit digit (Most Significant Digit) supplied by the buffer register is compared with bits 5–9 of the single digit from the code drum register; and the second 5-bit digit (Least Significant Digit) from the buffer register is compared with bits 1–4 and 9 of the same digit supplied by the code drum register. A similar bit comparison operation is followed in the comparison of the complementary signals supplied by the respective registers.

When the several bits have been compared, as suggested, the comparator 100 produces an output signal which is fed to the 65 bit storage 116. The output signal produced by comparator 100 is in binary form and, according to the code being used, a binary one may be used to indicate an identity or match of all of the respective bits supplied by both sources. That is, the five bits from each of the registers, which bits are being compared, are similar in polarity or sense. Conversely, a mismatch of one or more of the bits being compared results in a binary zero output signal from the comparator 100. It is understood, of course, that the output signal code may be reversed and that a high level output signal may actually represent a binary zero. These specific choices of coding arrangement may be varied according to individual preference or requirement.

In any event, the output signal from the comparator 100 is fed to the 65 bit storage 116. This storage device may be any type of storage apparatus and may, in fact, store more or less bits than the suggested 65 bits. However, in the preferred system using a printer having 130 characters per line and alternate-row-notation, the 65 bits represent one of the alternate rows to be printed. Moreover, this storage device is preferably comprised of 65 magnetic cores. When an output signal is produced by comparator 100, the state of one of the cores in the storage 116 is determined. Thus, if the output signal from comparator 100 is one polarity, for example a binary one, the particular core may be set or reset as the case may be. Subsequently, these cores are sensed in the usual way and a Print or No-Print signal is fed to the printing mechanism 112 for each symbol on each line. This printer operation is more fully described in the application by Eckert and Masterson, noted above and also further described in Patent 2,915,967. Actually, the storage 116 has as its primary function the role of rendering the printing mechanism and the comparator compatible as regards speed of operation. This is necessary due to the relatively slow operation of the printer.

While the comparator 100 compares the information supplied by buffer register 106 and code drum register 102, many intermediate signals are generated by the gate circuits in the comparator. These intermediate signals are the output signals which are fed to the input of parity checker 110.

Parity checker 110 is comprised of several logic gates which operate as did the gates described in the comparator 100. The inputs obtained from comparator 100 are gated together in accordance with Boolean algebra principles (see infra) whereby the ODD-EVEN parity of the information in the comparator 100 may be checked. The operation of the parity checker is similar in both the alphameric and numeric modes and is described in detail subsequently. However, in the alphameric mode, the parity checker must make provision for checking the signals generated by the comparison of two serially applied digits. This provision is made by temporarily storing the signals produced by the MSD (first digit) comparison in the check-bit compensating flip-flop (see FIGURE 3) until the LSD (second digit) comparison is completed. The output signals (or signal in the one digit comparison) produced by the parity checker are indicative of the parity of the signals supplied by the comparator 100 and thereby indicative of the signals supplied to the comparator 100. In order to determine the significance of the output signals, they are fed into the error detection circuit 118 for sampling.

The error detection circuit 118 comprises a logic network which is responsive to the signals produced by the comparator 100. For example, a flip-flop circuit may be set, or reset as the case may be, by the application of a particular signal thereto by the parity checker 110. With the application of the prescribed signal, the error detection circuit 118 will produce an output signal to indicate the presence of an error in parity. This signal may be applied to halt the printing cycle of printer 112; or it may merely be utilized to indicate to the machine operator that an error is present. The error detection circuit 118 is more fully described in conjunction with FIGURES 3 and 5. Clearly, the error detection circuit 118 may operate only when no signal is applied thereto or it may permit printing only when a signal is applied thereto. For that matter, the exact operation of the logic of any of the various components shown in FIGURE 1 may be altered to suit individual requirements.

*General description of comparator circuit*

Figure 2:
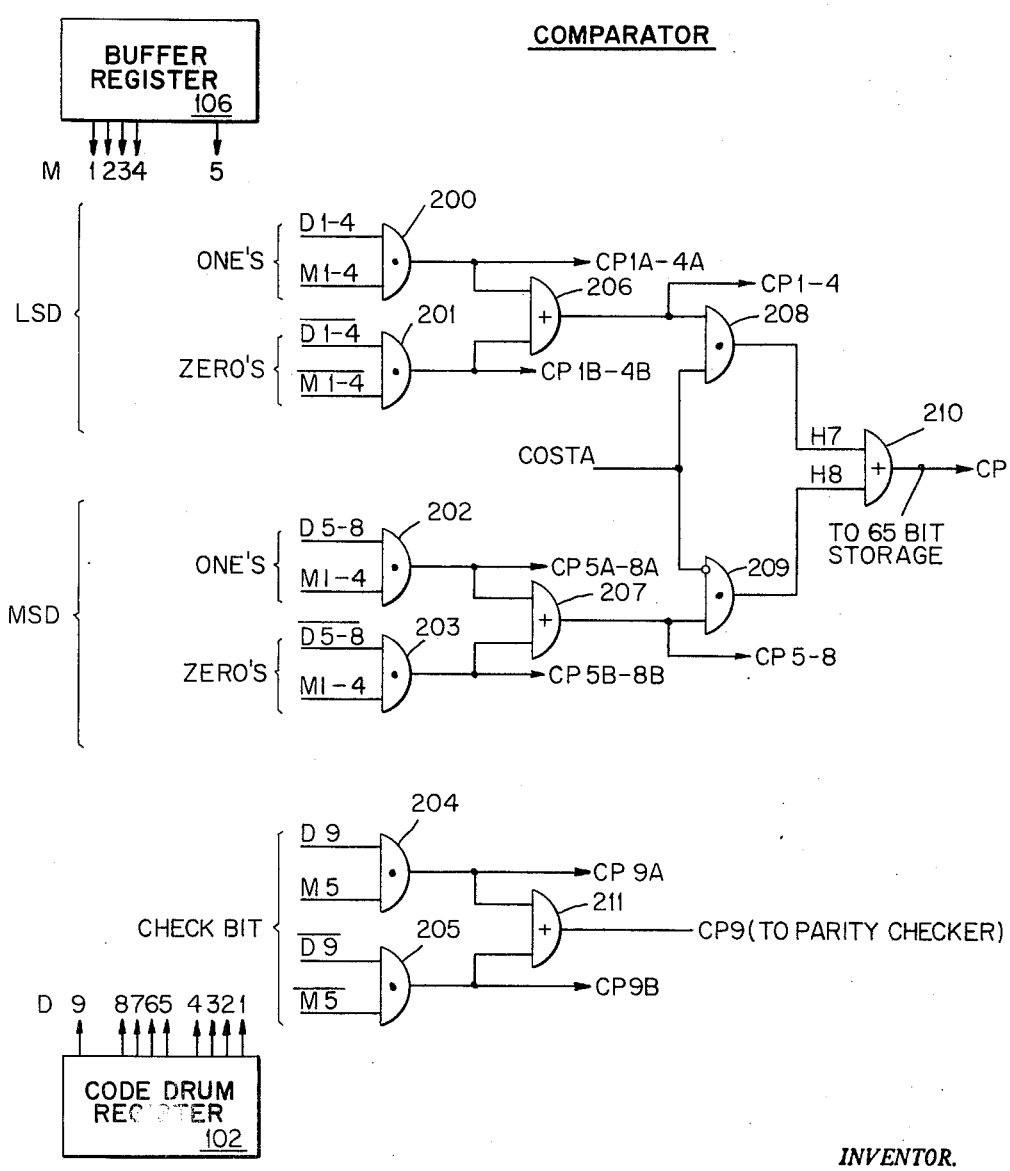
FIGURE 2 is a simplified logic diagram of the comparator portion of the invention.

Referring now to FIGURE 2, there is shown a simplified schematic diagram of the comparator 100. The comparator consists of a group of gates and buffers whose outputs comprise the comparison digit. These outputs are "whiffletreed" together to produce a single comparison signal CP. In the preferred embodiment, this signal indicates that an identity exists between the code drum character and the current output information digit from the memory. Comparison signal CP is used to set or reset a particular magnetic core in 65 bit storage 116 which ultimately controls the selection and printing of a particular symbol by the printer mechanism 112.

The comparison tests are conducted on a digit-by-digit basis for each of the printable characters on a line and a bit-by-bit basis for each digit. For the comparison operation in the numeric mode, the five bits M1–5 of each digit received from the output buffer register 106 are gated with the signals from channels D1–4 (LSD) and D9 (check bit) from the code drum register 102 as illustrated. In addition, the five complementary bits ($\overline{M1-5}$) of each digit received from the output buffer register 106 are gated with the complementary signals ($\overline{D1-4}$ and $\overline{D9}$) from the code drum register 102.

The signals M1–4 and D1–4 are gated together by gates shown symbolically as gate 200. In actuality, gate 200 may comprise four separate gates (see FIGURE 4). Each of these gates will operate on a pair of associated signals, e.g., M1 and D1, M2 and D2, etc. The signals M5 and D9 are gated together by gate 204 which normally comprises a single gate. The complementary signals $\overline{M1-4}$ are gated together with complementary signals $\overline{D1-4}$ by gate 201. Again, gate 201 is a symbolic showing and may, in actuality, comprise four separate gates each operating on a pair of associated signals. Also, signals $\overline{M5}$ and $\overline{D9}$ are gated together by gate 205.

Gate 200 is shown as producing four outputs, viz. CP1A–4A. Clearly, each of these output signals is derived from one of the four gates comprising gate 200. These signals are identified with regard to the input signals which control the output signals. For example, output signal CP1A is produced in accordance with the polarity or level of the input signals M1 and D1. Similarly, signal CP2A is determined by signals M2 and D2, etc. Gate 201 also produces four output signals identified as CP1B–4B. These signals represent the output signals produced by the input signals $\overline{D1-4}$ and $\overline{M1-4}$ applied to the four gates which actually constitute gate 201. The four output signals from each of gates 200 and 201 are further gated together by gate 206. Once again, gate 206 is a symbolic showing of four actual gates which produce the output signals CP1–4. Thus, the associated pairs of signals CP1A–4A and CP1B–4B are combined to produce a logic-path output-signal. That is, signal CP1A and CP1B are gated together to produce signal CP1; signals CP2A and CP2B are gated together to produce signal CP2, and so forth. It may be seen that by so identifying the signals, a logic path may be traced from the inputs to the ultimate outputs of the comparator 100.

The signals CP1–4 are applied to the inputs of gate 208. In addition to the inputs CP1–4, there is applied to gate 208 a control signal COSTA. Gate 208 can only be rendered operative when the control signal is applied thereto. Thus, an output signal will be produced by gate 208 only when the control signal COSTA is applied thereto coincidentally with the input signals CP1–4. The level of the output signal H7 produced by gate 208 is dependent upon the levels of the input signals applied to gate 208. Another gate, 210, then has applied thereto the signal which is produced by gate 208. Gate 210 produces an output signal CP the level of which is dependent upon the level of input signal (H7) applied thereto. The signal CP is fed from gate 210 to the proper core in the 65 bit storage 116 whereby said core is set or reset as the case may be.

In the alphameric mode of operation, the logical operation is very similar. The major difference is that instead of a single 5-bit digit being compared with the code drum character digit currently at the code drum register, two 5-bit digits are applied to the comparator in series. The first of the two 5-bit digits represents the Most Significant Digit (MSD). The five bits (M1–5) of the MSD are gated with the signals from channels D5–9, respectively and the five complementary bits ($\overline{M1-5}$) are gated with the complementary signals $\overline{D5-9}$, respectively. Similar to the Numeric mode of operation, signals M5 and D9 and signals $\overline{M5}$ and $\overline{D9}$ are gated together by gates 204 and 205, respectively. In addition, after the MSD information is operated upon, signals M1–4 and D5–8 are gated together by gate 202; while signals $\overline{M1-4}$ and $\overline{D5-8}$ are gated together by gate 203.

As in the case of symbolic gates 200 and 201, the symbolic gates 202 and 203 each comprise four separate gates each of which produces a separate output signal. Thus, signals CP5A–8A are produced by gate 202 and signals CP5B–8B are produced by gate 203. Again, corresponding A and B signals are gated together by one of the four gates which actually comprise symbolic gate 207. Each of the gates in gate 207 produces an output signal (CP5–8) which signals are fed to gate 209. As in the case of gate 208, gate 209 is controlled by the control signal COSTA. Unlike gate 208, however, gate 209 is rendered inoperative by the application of a COSTA signal and rendered operative by the signal $\overline{COSTA}$. This is schematically shown by designating gate 209 as an inhibit gate which is blocked by the application of control signal COSTA. Alternatively, another gate may be inserted between the control signal source and one of gates 209 or 210 to invert the control signal COSTA. When the control signal $\overline{COSTA}$ is applied to gate 209, the output signal H8 is produced thereby and fed to gate 210. The output signal CP (if present) is then fed to a temporary storage flip-flop (not shown) to await the result of the LSD comparison.

When the next 5-bit digit (LSD) is ready for processing, it is fed to the comparator 100. This time, the digit is fed in exactly as in the numeric mode of operation. That is, bits M1–4 are gated with signals D1–4 at gate 200 and bit M5 is gated with signal D9 at gate 204. In addition, the complementary signals $\overline{M5}$ and $\overline{D9}$ are gated together at gate 205. Thereafter, the LSD portion of the comparator performs exactly as described supra in the numeric mode of operation. Upon the completion of the LSD comparison, the gate 210 has applied thereto signal H7. Depending upon the results of the comparison, a second CP signal may or may not be fed to the temporary storage flip-flop. Assuming that there are no mismatches, the CP signal will be generated by both MSD and LSD operations. These *two* CP signals will then cause a core in the 65 bit storage 116 to be set or reset, as the case may be. However, a lack of one or both of the CP signals (indicative of a mismatch) will cause the core in question to remain as it was and, therefore, not be set or reset.

It will be seen that gates 208 and 209 are mutually exclusive gates. That is, gate 208 is rendered operative only by the application of the control signal COSTA and gate 209 is rendered operative only by the application of the control signal $\overline{COSTA}$. Since only one of the control signals can be produced by the control signal producing network (not shown) at a time, only one of gates 208 and 209 will be rendered operative to produce an output signal at any time.

The check bit logic path operates similarly in both numeric and alphameric modes of operation. That is, the associated pairs of signals are, in both cases, D9 and M5 and $\overline{D9}$ and $\overline{M5}$. These associated signal pairs are fed to gates 204 and 205, respectively. Gates 204 and 205 are, as shown, single gates which produce one output signal each. These output signals CP9A and CP9B, produced by gates 204 and 205 respectively, are applied to the inputs of gate 211.

Gate 211 operates in a similar manner to gates 206 and 207. That is, gate 211 produces an output signal CP9 in response to the input signals CP9A and CP9B. However, unlike gates 206 and 207, gate 211 does not feed its output to further gates or logic networks within the comparator 100. Rather, gate 211 feeds its output signal CP9 only to the parity checker 110. In fact, it will be seen in FIGURE 2 that all of the output signals produced by the comparator 100, with the exception of CP, are fed to the parity checker 110.

*General description of parity checker circuit*

Figure 3:
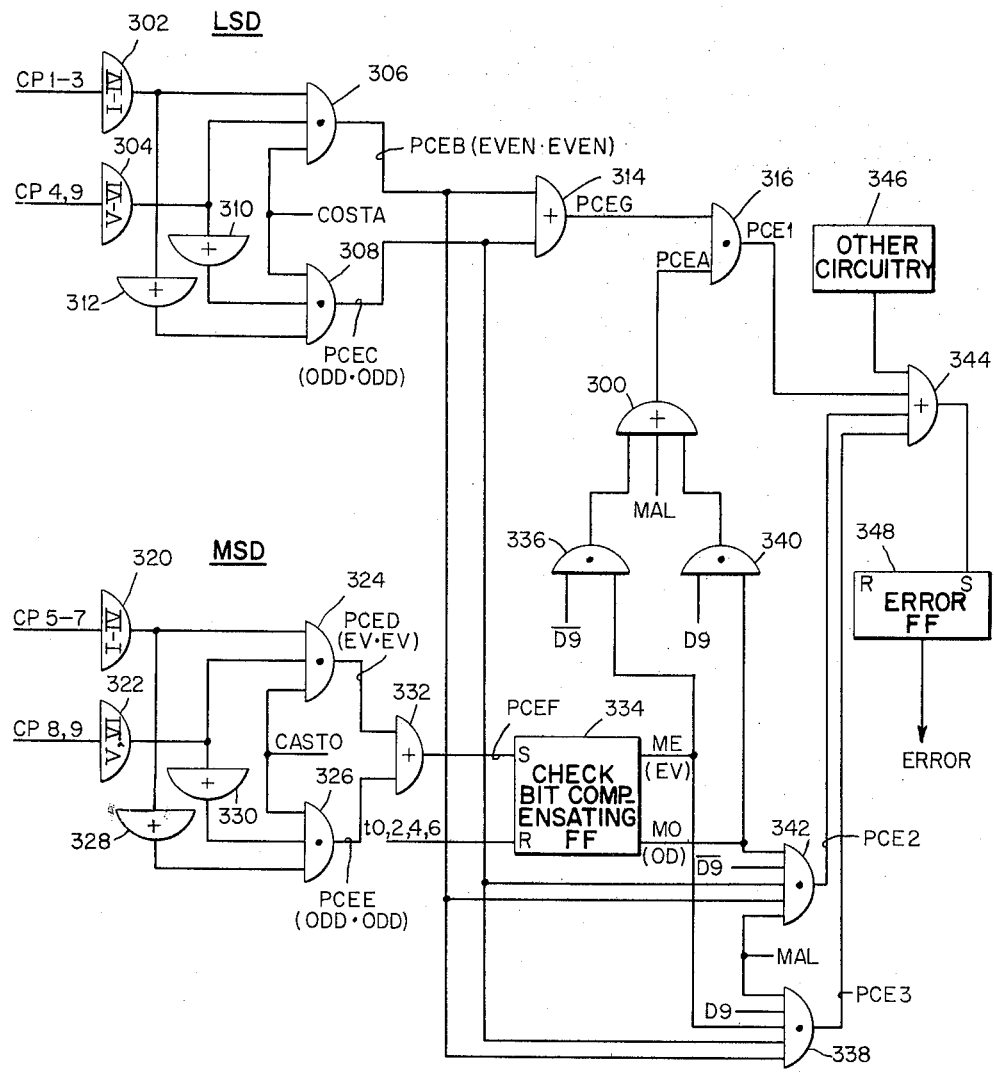
FIGURE 3 is a simplified logic diagram of the parity checker section of the invention.

Referring now to FIGURE 3, there is shown a simplified schematic diagram of the parity checker 110. Parity (ODD-EVEN) errors are detected by the gating circuits illustrated. These circuits produce an output error signal whenever the associated parity checkers indicate that the results of comparing the output information with the code drum signals do not degree with certain criteria that varies according to the one-or-two-digit modes of operation. Since the parity checks are not made until after the information enters the comparator 100, they serve to effectively check the operation of all the information handling components between the code drum 104 and the processing equipment.

In the one-digit (numeric) mode of operation, an output from the LSD portion of the parity checker is all that is required to indicate a parity error, and set the error flip-flop 348. The criterion here is that an error is indicated by signal PCE1 whenever an even total of comparison bits (for example, binary "ones") in the comparison digit (CP1–4 and 9) result from comparing the output information digit M1–5 from buffer register 106 with channels D1–4 and 9 from the code drum register 102.

Figure 5:
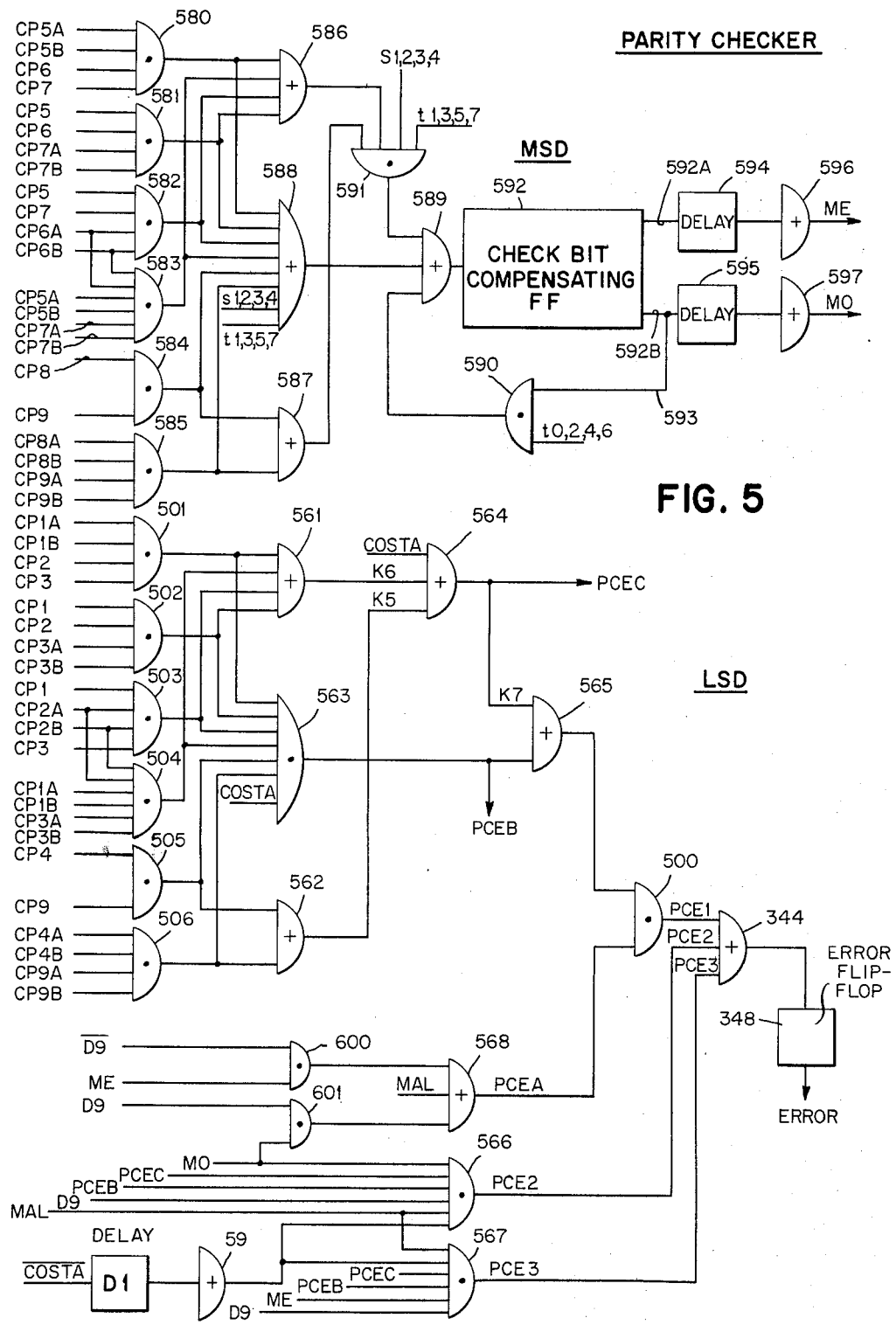
FIGURE 5 is a detailed logic diagram of the parity checker section of the invention.

The LSD or one-digit parity checker consists of six gates (I through VI). These six gates, which are shown symbolically as gates 302 (I–IV) and 304 (V, VI) are arranged to detect various combinations of the signals comprising the comparison digit so that an even number (0, 2, or 4) of comparisons is indicated as a result of the one-digit comparison operation. Gate 302 has applied to the inputs thereof, signals CP1–3 (including the associated A and B signals). Gate 304 has applied thereto signals CP4 and 9 (including A and B signals). These signals are produced by the comparator 100 as previously described and the specific arrangement of signals and gates is shown in FIGURE 5.

The Boolean expressions for these six gates are given below. The first expression (1) represents the condition when output signals, which are generated by the application of an even number of comparison signals CP1–3 to gates I, II, III or IV (i.e. gate 302) are combined with output signals which are generated by the application of an even number of comparison signals CP4, 9 to gates V or VI (i.e. gate 304). The combination of these signals each of which is representative of an even number of comparisons, produces the output signal PCEB which is indicative of EVEN parity and, thus, parity error in the LSD operation.

(1)

| Gates | (I) | (II) | (III) | (IV) | (V) | (VI) |
|---|---|---|---|---|---|---|
| CP Signals | $\bar{1}.2.3+1.\bar{2}.3+1.2.\bar{3}+\bar{1}.\bar{2}.\bar{3}$ | | | | $.4.9+\bar{4}.\bar{9}$ | |
| No. of Comparisons | 2 | 2 | 2 | 0 | 2 | 0 |
| Error (PCEB) | | (Even) | | | . (Even) = Even (0, 2 or 4) | |

The second Expression 2 is the logical inversion of the first. In this case, an EVEN parity error is indicated if the output from these same gates result from an odd number of comparison signals from each side of the expression. That is if an odd number of comparison signals CP1–3 are applied at gates I–IV and an odd number of comparison signals CP4, 9 are applied at gates V and VI, an output signal PCEC, which is again indicative of EVEN parity and a parity error in the LSD operation, is produced by gate 308.

(2)

| Gates | (I) | (II) | (III) | (IV) | (V) | (VI) |
|---|---|---|---|---|---|---|
| CP Signals | $1.\bar{2}.\bar{3}+\bar{1}.\bar{2}.3+\bar{1}.2.\bar{3}+1.2.3$ | | | | $.4.\bar{9}+\bar{4}.9$ | |
| No. of Comparisons | 1 | 1 | 1 | 3 | 1 | 1 |
| Error (PCEC) | | (Odd) | | | . (Odd) = Even (2 or 4) | |

The inversion of the logic is automatically produced since gates 310 and 312 are inserted in the input circuits of gate 308. Thus, the output signals from gates I–IV are fed to combining gate 308 via inverter gate 312; and the signals from gates V and VI are fed to combining gate 308 via inverter gate 310. Therefore gate 308 produces an output signal PCEC in accordance with logic which is inverted with respect to gate 306.

However, the error signals PCEB and PCEC are not generated until the appearance of the synchronized control signal, COSTA, at gates 306 and 308. With the appearance of the control signal COSTA, these signals are produced and applied to the inputs of gate 314. Gate 314 then produces the signal PCEG which is applied to gate 316. Also applied to an input of gate 316 is the signal PCEA which is produced by the MSD portion of the parity checker 110. However, signal PCEA is normally low since gate 309 can produce a high level signal only when the control signal MAL is applied thereto and signal MAL is only generated when the circuit is operating in the alphameric mode. Therefore, signal PCE1 is in effect, actually determined by signal PCEG. The signal PCE1 is then applied to error flip-flop 348 via gate 344 to set the flip-flop in the case of a parity error.

An error in the parity of comparison digit comprising signals CP1–4 and 9, produced by the comparator 100 can be caused by one of two conditions as shown by the above Boolean expressions. Thus, the group of signals comprising signals CP1–3 may include an even number of comparisons when the CP4, 9 signal group is even; or each of the groups may include an odd number of comparisons. As noted, an EVEN.EVEN or ODD.ODD situation represents an EVEN parity condition. This constitutes an ERROR condition in an ODD parity system. In accordance with the code convention, signals PCEB and PCEC are signals which indicate a parity error and signals $\overline{PCEB}$ and $\overline{PCEC}$ are signals which indicate correct parity. These signals are gated together at gate 314 such that if either one or both of the error signals (PCEB and PCEC) are present, gate 314 produces an error signal PCEG. Error signal PCEG is then applied to gate 316, thereby to cause the production of error signal PCE1 which, in turn, sets error flip-flop 348 (via gate 344) and produces the output signal, ERROR.

Clearly of course, the converse is also true. That is, if the signal groups CP1–3, CP4, 9 are representative of a correct parity comparison digit from the comparator, one of the groups will include an even number of comparison signals and the other group will include an odd number of comparison signals. When each of gates 306 and 308 has applied thereto an ODD.EVEN input combination from 302 and 304 the error signals PCEB and PCEC will not be produced when the control signal COSTA is applied (rather signals $\overline{PCEB}$ and $\overline{PCEC}$ will be produced). Therefore, gate 314 will have applied thereto two low level signals (by convention) and signal PCEG will be a high level signal. The high level input signal PCEG applied to gate 316 will cause the production of a low level signal PCE1 which may be designated as signal $\overline{PCE1}$. This output indicates that there is no error in the parity of the comparison signal produced by the comparator 100 (during the numeric mode).

In the two-digit (alphameric) mode of operation, the parity checker performs an ODD.EVEN check on each of the two comparison digits generated by the comparator 100. The checking of the first comparison digit is performed by the MSD portion of the parity checker. This circuit contains six gates (I through VI) that function similar to the six gates described above for the LSD portion of the parity checker and utilizing similar Boolean principles. These six gates are symbolically shown as two gates. Thus, gate 320 represents gates I–IV and gate 322 represents gates V, VI. Again, these gates are arranged to detect various combinations of signals in the comparison digit. For example, gate 320 has applied to the inputs thereof, signals CP5–7 (including the associated A and B signals) and gate 322 has applied thereto signals CP8, 9 (including A and B signals). These signals (CP5–9) and gates (I through VI) are arranged according to the Boolean expressions, supra. Thus, gate 324 produces the output signal PCED when the EVEN.EVEN condition of the input signal groups exist. In addition, gate 326, which is coupled to gates 320 and 322 via gates 328 and 330 respectively, produces the output signal PCEE when the ODD.ODD condition of the input signal groups exist. Therefore, signals PCED and PCEE indicate errors in the parity of the comparison digit (and signals $\overline{PCED}$ and $\overline{PCEE}$ indicate correct parity).

The signals PCED and PCEE are generated by gates 324 and 326 respectively and applied to the inputs of gate 332 when the control signal CASTO is supplied to gates 324 and 326. The control signal CASTO is similar in function to control signal COSTA; however, the signal CASTO occurs prior to signal COSTA since the MSD portion of the parity checker is put into operation prior to the LSD portion. When signals PCED and/or PCEE are applied to gate 332 the signal PCEF is produced and is applied to check-bit compensating flip-flop 334. The application of signal PCEF results in setting the check-bit compensating flip-flop 334 which holds the result until the LSD portion of the circuit is checked. The result of the MSD parity check is indicated by the flip-flop output signals ME (EVEN parity) and MO (ODD parity).

Clearly, the nature of signals ME and MO are dependent upon the code used throughout the system. That is, signals ME and MO are actually being produced by flip-flop 334 at all times. It is merely the polarity which is altered. For example, in accordance with the code suggested heretofore, ME will be a low level signal in order to indicate the EVEN parity condition of the MSD information, and, similarly, MO will be a low level signal to indicate the ODD parity. Moreover, due to the operation of flip-flop 334, when one of the signals ME and MO is low the other signal is automatically high so that the signals are seen to be mutually exclusive. Of course, opposite polarity convention of the signals may be utilized in a system using a different code arrangement.

The output signals from compensating flip-flop 334 are then fed to a gate group which is related to the error signal producing flip-flop 348. Thus, the signal ME is fed to the gates 336 and 338 and signal MO is fed to gates 340 and 342. In addition, the signal $\overline{D9}$ (indicative of no check bit from code drum register) is fed to gates 336 and 342 and the signal D9 (indicative of a check bit from code drum register) is applied to gates 340 and 338.

The outputs of gates 336 and 340 are fed to gate 300. With the application of the control signal MAL to gate 300, the output signal PCEA is produced. This signal is fed to gate 316 and, in conjunction with signal PCEG, determines the polarity of output signal PCE1. The signal PCEA, it will be seen, may be considered to control gate 316 regarding the production of signal PCE1. That is, there are possible code configurations in which the MSD information will have ODD parity and the LSD information would have EVEN parity. However, in this situation the signal PCEG which indicates EVEN parity in the LSD information is, in fact, a correct signal. Therefore, it must be arranged that this signal does not produce the error signal PCE1. This is accomplished by having gate 300 produce a signal PCEA which will block 316. The signal produced by gate 300 clearly must be a result of the signals applied to gates 336 and 340. Thus, if PCEG is to represent a correct EVEN parity LSD signal, the MSD information in a correct comparison situation, would produce either an EVEN parity MSD information with check bit or ODD parity MSD information without a check bit. More particularly, these signal pairs which would be generated (as low level signals) must be ME and D9, or MO and $\overline{D9}$. Clearly, in both of these situations each of the gates 336 or 340 will produce a low level output signal since each gate will have one high level input signal applied thereto. Clearly, in view of the operation of the gates, the application of two low level input signals to gate 300 will produce a high level output signal PCEA which effectively blocks gate 316 by requiring that a low level output signal PCE1 be produced thereby.

Conversely, if the MSD output signals are ME and $\overline{D9}$, or MO and D9, either gate 336 or 340 will produce a high level output signal which is fed to gate 300 whereupon gate 300 produces a low level signal at the input of gate 316. In view of the two low level signals applied thereto, gate 316 produces a high level output signal PCE1. This high level signal is then fed to gate 344 which produces a low level output or set signal which set error flip-flop 348 thereby producing the ERROR signal. This condition may be presented by certain input information conditions as, for example, EVEN parity LSD and EVEN parity MSD information with no check bit ($\overline{D9}$).

Simultaneously with the above gating operation, gates 342 and 338 gate together other signals. For example, gate 342 operates with the signals MO, $\overline{D9}$, PCEB, PCEC and the control signal MAL. Similarly, gate 338 operates with the signals ME, D9, PCEB and PCEC. It will be seen that the logic operation of these gates is similar to the logic operation of the gate arrangement previously described regarding ODD.EVEN information checking. The signals PCE2 and PCE3 produced by gates 342 and 344, respectively, are also fed to gate 344 to determine the level of the signal which is fed to the error flip-flop 348. At this point it is sufficient to note that the error signals PCE1, PCE2 and PCE3 are produced in accordance with the following table:

| Error Signal | MSD | LSD | Check Bit |
|---|---|---|---|
| PCE1= | Even. | Even. | $\overline{D9}$ |
| PCE1= | Odd. | Even. | D9 |
| PCE2= | Odd. | Odd. | $\overline{D9}$ |
| PCE3= | Even. | Odd. | D9 |

The gate 344 may, in actuality, represent a gate which has applied thereto error signals from other circuits. These other circuits are represented diagrammatically by the block 346. Examples of other errors which may be included in block 346 are printer failures, paper failures, errors produced in other checks by other check circuits, etc. Any of these error signals applied to gate 344 may be sufficient to cause the gate to produce the set output signal which sets error flip-flop 348 and produces the ERROR signal. The ERROR signal may then be applied to any number of known or desirable components or peripheral equipment. For example the error signal could cause the machine to stop, recycle, sound an alarm, or the like.

*Detailed description of the comparator*

Figure 4:
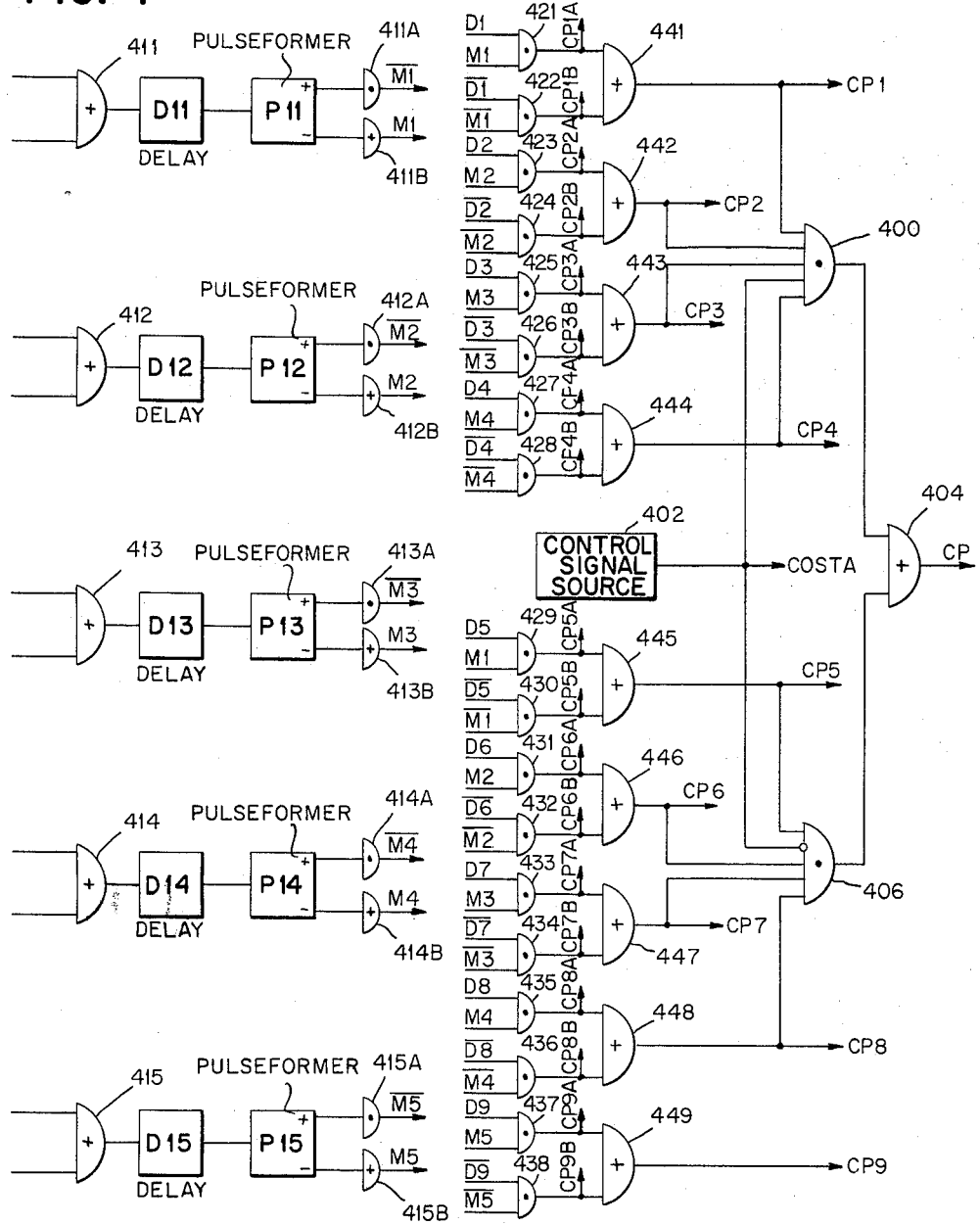
FIGURE 4 is a detailed logic diagram of the comparator portion of the invention.
Figure 4:
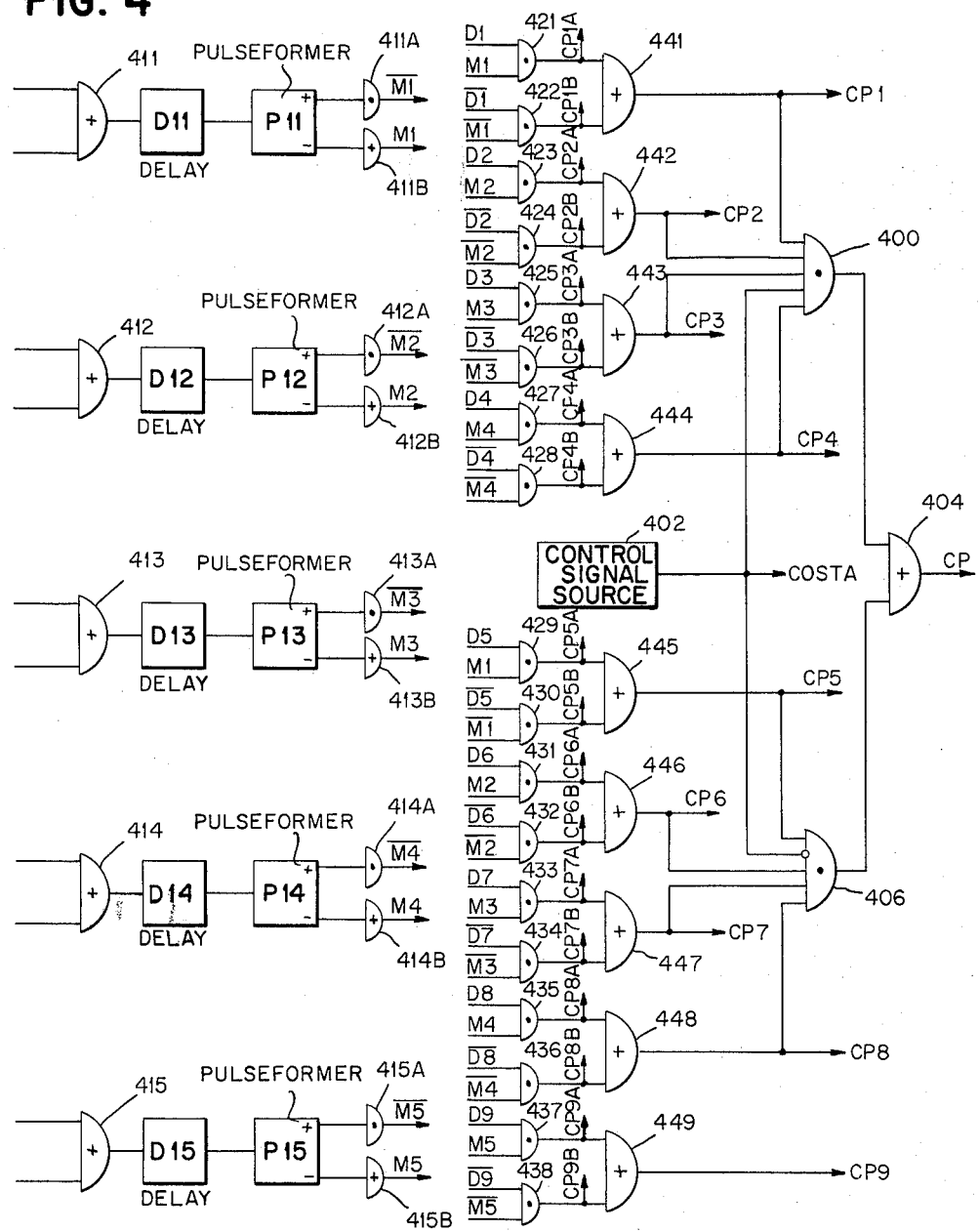

Reference is made now to FIGURE 4. In order to more thoroughly understand the operation of the comparator 100, as shown in FIGURE 2, some examples will be given. These examples will be presented in conjunction with FIGURE 4, which is a detailed schematic diagram of comparator 100. In the first example, it will be assumed that the digits to be compared first are identical and that the system is operating in the numeric or one-digit mode. Thus, the 5-bit digit supplied by memory 108 will be taken to be 01101. It should be clear that this suggested code is exemplary only and other codes may actually be used. This digit will be applied to the inputs of gates 411–415, inclusive. Similarly, the 9-bit digit supplied by code drum 104 will be assumed to be 000001101. (However, the zeros in bit positions 5–8 may be ignored in the numeric operation.) The 9-bit digit supplied by code drum 104 is applied to gates 421–438 via pulseformers (not shown) in the code drum register 102 whereby real and complement signals are created. This digit supplied by code drum 104 indicates that a numeric symbol on the type wheel in the printing mechanism 112 is adjacent the printing location. In addition, the digit supplied by memory 108 indicates that the symbol represented by the digit is desired to be printed. A comparison of the two digits on a bit-by-bit basis will be performed by the comparator 100 and, in view of the match or identity thereof, the comparator will produce a signal to indicate that the symbol desired by memory 108 is now in position to be printed and the printing mechanism 112 will be activated accordingly.

The digit 01101 is applied to the gates 411–415 with the least significant bit being applied to the first gate, i.e., gate 411, and most significant bit being supplied to the last gate, i.e. gate 415. Thus, in the given example, gate 411 has applied thereto a binary "one." This "one" will be represented, for convenience, as a high level signal. (Clearly, the choice of a high level signal as representative of a binary one in the memory 108 is a matter of coding choice and other practical considerations. Moreover, the coding conventions used by the code drum and by the memory may be opposite, as shown, and inverter gates utilized so long as the logic is consistent.) The application of a high level signal to the input of gate 411 produces a low level signal at the output thereof. This low level signal is then passed to the pulseformer P11 via delay line D11. Moreover, the operation of pulseformer P11 has been previously described with relation to the relative output signals produced in accordance with the polarity or level of the input signal applied thereto. Therefore, it will be seen that the application of a low level signal to the input of pulseformer P11 produces output signals which have opposite polarity to that shown at the terminals of pulseformer P11 in FIGURE 4. That is, with the application of a low level signal to the input of P11, the output signal from the (+) terminal of P11 is a low level signal and the output signal from the (−) terminal of P11 is a high level signal. The low level output signal is applied to the input of gate 411A and the high level output signal is applied to the input of gate 411B. Both of these gates act as inverters whereby gate 411A produces a high level output signal and gate 411B produces a low level signal M1 at the output thereof.

The output signals $\overline{M1}$ from gates 411B and 411A respectively, are then fed to the inputs of comparator input gates 421 and 422, respectively. As the other of its two input gates 421 receives a signal D1 from memory 108. Gate 422 has as the other of its two inputs, signal $\overline{D1}$ from the memory 108. Similar to the method of application of the digit to gates 411–415, the first gate pair, i.e., gates 421 and 422, will receive the least significant bit from the memory 108. That is, the binary bit supplied to gates 411 and the complementary signal produced by pulseformer P11 will be fed to these gates.

The information signals supplied to comparator 100 by the memory 108 via the input logic paths are such that a low level signal is produced at the barred comparator inputs for a zero applied at any of the input gates 411–415. Conversely, a high level signal is produced at the unbarred comparator inputs. Moreover, a binary "one" is indicated when the barred comparator input receives a high level signal and the unbarred input receives a low level signal. It will be seen that the information signals supplied to the comparator 100 by the code drum register 104 folllow a similar pattern.

Therefore, since the first bit in the digit from the memory is a "one," the input signal applied at input M1 is a low level signal and input signal $\overline{M1}$ is a high level signal. Moreover, in view of the first bit from the code drum register being a binary one, D1 is a low level signal and $\overline{D1}$ is a high level signal. It will be seen, therefore, that gate 421 receives all low level signals (that is, M1 and D1 are both low level signals) and, consequently, produces a high level output signal, CP1A. In contradistinction thereto, gate 422 receives high level signals at both of its inputs and, therefore, produces a low level output signal, CP1B. The signals CP1A and CP1B are applied to the parity checked discussed in conjunction with FIGURES 3 and 5.

In addition, signals CP1A and CP1B are fed to gate 441 which produces a high level signal only in response to all low level input signals. Clearly, as described, signal CP1A is a high level signal, and only signal CP1B is a low level signal. Therefore, gate 441 produces a low level output signal, CP1. Again, this signal is applied to the parity checker discussed in conjunction with FIGURES 3 and 5.

In addition, signal CP1 is fed to gate 400 which produces a high level signal only when all the inputs applied thereto are low level signals. Therefore, it will be necessary to trace each of the logic paths initiated by gates 412, 413 and 414. If each of these paths ultimately produces a low level signal which is fed to gate 400 a high level signal H7 will be produced thereby. Conversely, if any of the signals produced by said logic paths and fed to gate 400 is a high level signal, the signal H7 produced by gate 400 will be a low level signal (which may be represented as $\overline{H7}$). Of course, the output signal from gate 400 can only be produced concurrently with the application of control signal COSTA which is supplied by control signal source 402. The output signal of gate 400 is then applied to gate 404 and the relative level of output signal CP of gate 404 is determined accordingly. The signal CP is then fed to the 65 bit storage 116 as previously described.

Tracing now the logic path associated with input gate 412, a binary zero is applied at an input thereof. By the predescribed coding convention, a binary zero is represented by a low level signal. Therefore, the inversion by gate 412 produces a high level output signal which is applied to pulseformer P12 via delay line D12. The application of a high level signal to the input of pulseformer P12 produces two output signals which are complements. In this instance, a high level is produced at the (+) terminal and a low level signal is produced at the (−) terminal of pulseformer P12. These signals are supplied, respectively, at the inputs of gates 412A and 412B which invert the signals and produce the low level and high level output signals $\overline{M2}$ and M2, respectively. The signals M2 and $\overline{M2}$ are applied respectively to gates 423 and 424 which represent the gate pair associated with input gate 412 and which are input gates of comparator 100.

Similarly, the other inputs of gates 423 and 424 have applied thereto signals from code drum register 102. According to the predescribed coding convention, a zero from the code drum register is represented by a high level signal at the unbarred input D2 and a low level signal at the barred input $\overline{D2}$. Consequently, the output signal CP2A produced by gate 423 is a low level signal since signals D2 and M2 are each high level signals; and output signal CP2B produced by gate 424 is a high level signal since each of the input signals $\overline{D2}$ and $\overline{M2}$ are low level signals. These two output signals CP2A and CP2B are applied to the parity checker 110. In addition, the signals CP2A and CP2B are fed to gate 442. Since signal CP2B is a high level signal, the output signal CP2 produced by gate 442 (and applied to gate 400) must be a low level signal.

In accordance with the coding arrangement, this low level output signal CP2 is indicative of a match between the signal generated by the memory 108 and the signal generated by the code drum 104. That is, the signal delivered by the code drum 104 has, in the illustrative example, been determined to be a zero. Thus, the output signal CP2 is a low level signal, which, in accordance with the coding convention may be considered to be a binary one. The signal CP2 is then applied to an input of gate 400 in order to assist in the determination of the level of signal H7 which will control the print mechanism 112 through the generation (or not) of signal CP by gate 404.

Once again tracing another of logic paths, it will be seen that in accordance with the illustrative example, a binary one or high level signal will be applied to an input of gate 413. Gate 413 will, therefore produce a low level output signal which in turn is fed to pulseformer P13. Pulseformer P13 will produce a low level output signal at its (+) terminal and a high level signal at its (−) terminal. These signals are respectively fed to inverter gates 413A and 413B which, in turn, produce a high level signal $\overline{M3}$ and a low level signal M3 respectively. The signals M3 and $\overline{M3}$ are applied to gates 425 and 426 respectively. Also applied to gates 425 and 426 are signals D3 and $\overline{D3}$ which, in accordance with the coding convention, are respectively low and high level signals since the signal supplied by code drum 104 represents a binary one. Gate 425 produces a high level output signal CP3A in response to the two low level input signals D3 and M3. Gate 426 produces a low level signal CP3B in response to the input signal $\overline{D3}$ and $\overline{M3}$ each being a high level signal. Again, signals CP3A and CP3B are fed to the parity checker 110 as well as to gate 443. Gate 443 produces a low level output signal CP3 because of the high level input signal CP3A. Once again, this low level signal CP3 is indicative of a match between the signals supplied by code drum register 102 and the memory 108. The signal CP3 is also applied to gate 400 to assist in the determination of the level of output signal H7 which is applied to gate 404 to determine the level of output signal CP.

Tracing another of the logic paths, it will be seen that in accordance with the illustrative example, a binary one or high level signal will be applied to an input of gate 414. Gate 414 will, therefore, produce a low level output signal which, in turn, is applied to pulseformer P14. Pulseformer P14 will produce a low level output signal at its (+) terminal and a high level signal at its (−) terminal. These signals are respectively fed to inverter gates 414A and 414B which in turn produce a high level signal $\overline{M4}$ and a low level signal M4, respectively. The signals M4 and $\overline{M4}$ are applied to gates 427 and 428, respectively. Also applied to these gates are code drum signals D4 and $\overline{D4}$ which, in accordance with the coding convention, are, respectively, low and high level signals since the signal supplied by code drum 104 is a binary one. Gate 427 produces a high level output signal CP4A in response to the two low level input signals D4 and M4. Gate 428 produces a low level signal CP4B in response to the two signals $\overline{D4}$ and M4 each being a high level signal. Signals CP4A and CP4B are fed to the parity checker 110 as well as to gate 444. Gate 444 produces a low level output signal CP4 because of the high level input signal CP4A. Once again, this low level signal CP4 is indicative of a match between the signals supplied by code drum 104 via code drum register 102 and the memory 108. The signal CP4 is also applied to gate 400 to assist in the determination of the level of output signal H7 which is fed to gate 404 to determine the level of output signal CP.

Tracing, finally, the check bit logic path, it will be seen that in accordance with the illustrative example, the binary zero or low level signal will be applied to an input of gate 415. Gate 415 will produce a high level output signal which, in turn, is fed to pulseformer P15. Pulseformer P15 will produce a high level output signal at its (+) terminal and a low level signal at its (−) terminal. These signals are respectively fed to inverter gates 415A and 415B which, in turn, produce a low level signal $\overline{M5}$ and a high level signal M5 respectively. The signals M5 and $\overline{M5}$ are applied to gates 437 and 438 respectively. Also applied to gates 437 and 438 are signals D9 and $\overline{D9}$ which, in accordance with the coding convention, are respectively low and high level signals since the signal supplied by code drum 104 is a binary zero. Gate 437 produces a low level output signal CP9A in response to the two high level input signals D9 and M5. Gate 438 produces a high level signal CP9B in response to the two signals $\overline{D9}$ and $\overline{M5}$ each being a low level signal. Again, signals CP9A and CP9B are fed to the parity checker 110 as well as to gate 445. Gate 449 produces a low level output signal CP9 because of the high level input signal CP9B. Once again, this low level signal CP9 is indicative of a match between the signals supplied by code drum 104 via code drum register 102 and memory 108. The signal CP9 is supplied to parity checker 110 to be used in the ODD-EVEN checking routine.

In accordance with the present illustrative example, each of the signals CP1, CP2, CP3, CP4 and CP9 are low level signals. The application of all low levels signals to the inputs of gate 400 causes the gate to produce a high level output signal H7 when the gate 400 is permised by the application of the control signal COSTA thereto. The high level signal H7 is fed to gate 404 which produces, therefore, a low level CP signal which is indicative of the identity of the compared digits. That is, the compared digits supplied by memory 108 and code drum 104 match bit-by-bit. The CP signal is then fed to the 65 bit storage 116, as noted previously.

The signals CP1, CP2, CP3, CP4 and CP9 represent 5 bits of what is defined as the "Comparison Digit." This digit is, therefore, comprised of 5 bits, similar to each of the digits fed to the inputs of the comparator 100. These bits follow the code convention wherein a low level signal represents a binary one and a high level signal represents a binary zero. In addition, the code convention followed is defined such that the low level or binary one signal indicates a match of corresponding bits in the digits being compared. Contrariwise, a high level or binary zero signal represents a mismatch of corresponding bits in the digits being compared. Therefore, this digit is checked for ODD or EVEN parity. Thus, each of the signals CP1, CP2, CP3, CP4 and CP9 are fed to parity checker 110 as described subsequently and, as will be seen, since the comparison digit is 11111, the parity is ODD.

In order to show the operation of the circuit in the event of a mismatch of corresponding bits in the digits being compared, the illustrative example may be used again with the exception that one of the bits in the digit supplied by buffer register 106 will be changed to be incorrect. That is, the signal supplied by the buffer register 106 will be 01111 and the digit supplied by the code drum register 102 will be 01101. Clearly, the first, second, third and fifth bits (reading from left to right) are identical in both digits and also correspond to the example previously described. Similarly, it is obvious that there is a mismatch of corresponding bits at the fourth bit of the digits being compared. It may be seen that the error is in the signal being supplied by buffer register 106 because this digit has EVEN parity. Of course, the error may actually be in the digit supplied by code drum register 102, but it will be noted that in practical applications, the physical make-up of the system is such that errors (even though highly unlikely) are more likely to be produced by the computer unit than the code drum 104.

Since only one bit is erroneous, it will be necessary to trace only one logic path, the logic path associated with gate 412 and the associated gate pair comprising gates 423 and 424 in order to determine the effect of a mismatch of corresponding bits. Conversely to the previous description, the binary one applied to gate 412 ultimately produces a high level signal $\overline{M2}$ which is applied to an input of gate 423. Because the signal supplied by code drum register 102 is still a binary zero, the signals D2 and $\overline{D2}$ applied to gates 423 and 424 respectively are high and low level signals respectively. Thus, gate 423 has applied thereto a high level input signal D2, and a low level input signal M2. Similarly gate 424 has applied thereto a low level signal $\overline{D2}$ and a high level signal $\overline{M2}$.

Therefore, it will be clear that each of gates 423 and 424 will produce low level output signals (viz. signals CP2A and CP2B respectively) since at least one of the inputs applied to each of these gates is a high level signal which necessarily precludes all of the inputs being from low level signals. Signals CP2A and CP2B, the two low level output signals from gates 423 and 424 respectively, are then applied to gate 442, which produces a high level output signal CP2. As previously discussed, this high level signal is representative of a binary zero. Moreover, since signal CP2 is a high level signal which is applied to gate 400, the output signal H7 produced by gate 400 must be a low level signal. The low level signal H7 which is then applied to gate 404 will cause gate 404 to produce a high level output signal CP. As noted before, the high level output signal CP is indicative of a mismatch of at least one of the bits of the digits being compared and is fed to the printing mechanism or the storage medium associated therewith such that the printing mechanism cannot be activated when there is a mismatch. Moreover, the comparison digit is 10111 wherein the parity is clearly EVEN and will be detected by the parity checker.

The operation of the comparator in the alphameric mode is substantially similar to a doubled or two-digit series operation of the system in the numeric mode. That is, the MSD information or first digit supplied by the buffer register 106 is applied to the inputs of gates 411–415 as previously described in connection with the numeric mode of operation. This information is fed along the logic paths associated with the aforesaid gates but is applied to the inputs of gates 429–438 where, as in the numeric mode, other input signals are supplied by code drum register 102. Subsequently, in accordance with the control signals supplied, the next 5-bit digit, the second in the two-digit code) is applied to the inputs of gates 411–415. This LSD information is passed along the logic paths associated with these gates. However, the output signals from these paths are now fed to the inputs of gates 421–428, 437 and 438 (as in the numeric mode) where other inputs are supplied with signals from the code drum register 102. It will be seen that the gate arrangememnt comprising gates 429 through 436 is identical with the gate arrangement comprising gates 421 through 428. Therefore, the operation of this gate arrangement is identical with the operation of the former arrangement, and the MSD information passes through the latter arrangement in a similar manner.

The operation of the comparator 100 in the alphameric mode can be better explained by means of another example. Thus, assume that the character on the code drum which is in the position to be printed by the printing mechanism has the code representation 110010110. For clarity this digit may be separated as 1-1001-0110. The ninth bit (left most bit) is the check-bit which is utilized by the comparator 100 and the parity checker 110 to perform their operations. The check-bit is a binary "one" since the parity of the digit must be ODD and, as is easily seen, the first 8 bits in the word include four binary ones whereby the digit has EVEN parity. In the event that the bit combination in the first 8 bits comprised an odd number of binary ones, the check bit would be a binary zero. For example, in the code used in a system which includes the subject comparator 100 and parity checker 110, the code word 010011000 (or 0-1001-1000) has a check-bit which is a binary zero since the number of binary ones in the word is ODD (viz., three).

The code representation 110010110 is supplied to the code drum register 102 by the code drum 104. The signals which are produced by the code drum register 102 are applied to the inputs of gates 421–438 in the comparator 100 similar to the previously described manner. As noted supra the unbarred inputs at gates 421–438 will have high level signals applied thereto when the input represents a binary zero and low level signals will be applied at the unbarred input of these gates when the input represents a binary one. In addition, the barred inputs of gates 421–438 will have applied thereto signals having polarity opposite to the signals applied to the unbarred inputs in the event of either a zero or a one being supplied by the code drum register 102. These input signals will be compared with signals supplied to the comparator 100 from the memory 108 via the buffer register 106.

Thus, when the word request dispatcher 114 selects a particular address in the main storage, the information stored therein is extracted in the form of two 5-bit digits, in series. The first of these digits (MSD) which is applied to gates 411–415 is 11001. As previously described, this information passes through the logic paths associated with the gates 411–415 whereby the real and complementary signals are applied to the inputs of gates 429–438. Here the unbarred inputs M1, M2, etc. of gates 429–438 receive the real signals and the barred inputs $\overline{M1}$, $\overline{M2}$, etc. receive the complementary signals. It should be remembered that in the preferred embodiment the code used by the memory 108, and the code used by the code drum 104 are opposite in polarity. For example, the first bit of the first digit applied to gates 411–415, is a binary one. This binary one is applied to the input of gate 411 as a high level signal and passed through its associated logic path so that gate 429 has applied, at input M1, a low level "real" signal which, in the system code, is representative of a binary one. Conversely, gate 430 has applied, at input $\overline{M1}$, a high level complementary signal. By similar circuit tracing, it may be shown that gates 435 and 437 have applied at their respective inputs M4 and M5, low level signals respectively because of the binary one applied at gates 414 and 415. These binary one inputs similarly produce the complementary high level signals which are applied inputs $\overline{M4}$ and $\overline{M5}$ of gates 436 and 438.

It will now be seen that the input signals have all been applied to the comparator input gates 429–438 and the operation of each becomes evident. Thus, the code drum 104 supplied the coded digit to the code drum register 102 which then supplied, inter alia, the signals $\overline{D5}$ and D5 (the fifth bit in the digit) as high and low level signals to gates 430 and 429, respectively. The MSD signals $\overline{M1}$ and M1 are high and low level signals supplied to gates 430 and 429, respectively (see supra). Therefore, gate 430 produces a low level output signal CP5B, and gate 429 produces a high level signal CP5A.

By similar circuit tracing, it will be seen that gates 431 and 432 respectively produce the signals CP6A and CP6B which signals are low and high level signals respectively. This is so because gate 431 has applied thereto the two high level signals D6 and M2; whereas gate 432 has applied thereto the two low level signals $\overline{D6}$ and $\overline{M2}$. Similarly, the gate pair comprising gates 433 and 434 produces signals CP7A and CP7B respectively which are, again, low and high level signals respectively, and the signals CP8A and CP8B produced by gates 435 and 436 are high and low level signals respectively in accordance with the signals applied to the inputs of these gates. Finally, the signals CP9A and CP9B are high and low level signals respectively. These signals are respectively generated by gates 437 and 438 in accordance with the predescribed input signals.

Following the description previously given, the information thus obtained passes through the MSD section of the circuit producing the low level signals CP5, CP6, CP7, CP8 and CP9. Each of these low level signals, except CP9, is applied to gate 406. Gate 406 cannot produce an output signal in accordance with these inputs until the control signal $\overline{COSTA}$ is received. (It will be recalled that gate 400 is permissed by the control signal COSTA.) With the application of the $\overline{COSTA}$ signal, gate 406 will produce a high level output signal H8 because each of the inputs applied thereto is a low level signal. Signal H8 is then fed to an input of gate 404 where the signal CP will be produced. (Since it has been assumed that there is no error present, signal CP will be a low level signal.) This CP signal is then fed to a flip-flop (not shown) and stored until the LSD information is compared. As will be described, according to the CP signals produced in the MSD and LSD circuit portions, a core in the 65 bit storage 16 may be set or reset.

Immediately after the MSD signals have cleared gates 411–415, the LSD information is impressed in the form of another 5-bit digit. This digit will be 10110. It will be seen that each of gates 411–414 now has applied thereto a signal having polarity which is opposite to that of the signals applied in the MSD operation. Consequently, the signals M1, $\overline{M1}$, M2, etc. generated by the logic paths associated with gates 411–414 are the inverse of those obtained in the LSD operation.

Gate 415, however, has a similar signal applied thereto in either case and its logic path operation remains the same. It should be noted that this particular occurrence of signals is merely coincidental and is not essential to the operation of the circuit. Moreover, any other coded bit group could be utilized. However, for purposes of explanation this particular bit arrangement was chosen.

Thus, where, in the MSD operational description, M1 was a low level signal applied to gate 429, M1 is now a high level signal which is applied to gate 421 in the LSD operation because the LSD signal applied to gate 411 is a binary 0 rather than a binary 1. This analogy applies to each of the M(n) or $\overline{M(n)}$ signals generated in the LSD operation (with the exeception of M5 and $\overline{M5}$). The signals M5 and $\overline{M5}$ are the same in both the LSD and MSD operations because gate 415 is supplied with a binary 1 in both cases. Clearly, then, it may be seen that the signals $\overline{M1}$, M2, M3, $\overline{M4}$, and M5 are low level signals; and the associated signals M1, $\overline{M2}$, $\overline{M3}$, M4 and $\overline{M5}$ are high level signals. These signal levels may be verified by tracing the LSD logic paths associated with gates 411–415.

It will be recalled that the first bit in the digit supplied by the code drum register 102 is a binary 0. Therefore, the signal $\overline{D1}$ is gated with another low level signal ($\overline{M1}$) by gate 422 and a high level signal CP1B is produced. The two signals D1 and M1 are similarly gated together. Since these two signals are high level signals, gate 421 produces a low level output signal CP1A. High level signal CP1B is gated with low level output signal CP1A by gate 441 to produce a low level output signal CP1 which is supplied to gate 400. Gate 400 is the LSD counterpart of MSD gate 406 and operates similarly. Thus, the signals CP2, CP3 and CP4 must be determined before the output signal H7 is produced by gate 400.

The second bit applied by the code drum register 102 is a binary one. Accordingly, the signals $\overline{D2}$ and D2 are high and low level signals respectively. Therefore, when the high level signal $\overline{M2}$ is applied to gate 424 along with the high level signal $\overline{D2}$, a low level output signal CP2B is produced. Similarly, when the low level signal M2 is gated with low level signal D2, gate 423 produces a high level output signal CP2A. These two signals, i.e., signals CP2A and CP2B, are gated together by gate 442. Since signal CP2A is a high level signal, gate 442 produces a low level output signal CP2. Again, this low level signal is fed to an input of gate 400.

The third bit in the digit applied by the code drum register 102 is again a binary one. Consequently, similar locations in the logic paths associated with the third bit have similar signal levels as are found in the logic path associated with the second bit. Thus, the signals $\overline{D3}$ and $\overline{M3}$ are both high level signals which are applied to gate 426. Gate 426 then produces the low level signal CP3B which is supplied to gate 443. The other input which is applied to gate 447 is the high level signal CP3A. CP3A is a high level signal produced by gate 425 in response to the two low level signals D3 and M3. In response to the signals applied thereto, gate 443 produces a further low level signal CP3 which is supplied to gate 400.

The fourth bit in the digit supplied by the code drum register 102 is, as was the first bit, a binary 0. Therefore, similar signals will be produced at similar locations in the logic paths associated therewith. Thus, the signals $\overline{D4}$ and $\overline{M4}$ are both low level signals. The application of these two low level signals to gate 428 produces the high level signal CP4B. In addition, the two high level signals D4 and M4 produce a low level signal CP4A at the output of gate 427. The two signals CP4A and CP4B are applied to inputs of gate 444. In response to these signals, gate 444 produces the low level signal CP4 which is applied to gate 400.

It will now be seen that all of the signals CP1, CP2, CP3 and CP4 which are supplied to gate 400 are low level signals. In addition, as noted previously, all of the signals CP5, CP6, CP7 and CP8 which were applied to gate 406 are also all low level signals. Consequently, with the application of the control signal $\overline{COSTA}$ by source 402, gate 406 will produce the high level output signal H8. The application of this signal to gate 404 causes the output signal CP to be a low level signal. This low level signal CP is, of course, indicative of an identity between the digit supplied by the code drum register 102 and the information supplied by the memory 108. This signal may be supplied to a storage flip-flop (not shown) as suggested supra until the LSD comparison is completed. With the application of the control signal COSTA by source 402 (subsequent to $\overline{COSTA}$), gate 400 will produce the high level signal H7 which is applied to gate 404. Gate 404, therefore, produces a low level signal CP which is applied to an output gate coupled to the aforesaid storage flip-flop. A core in the 65 bit storage 116 may then be set or reset in response to two low level CP signals. In the event that one (or both) of the CP signals is not present as a low level signal, the output gate will not produce a core setting signal.

Returning to the code drum register 102, input information, it will be seen that the ninth bit (check bit) supplied thereby is again a binary one. This condition determines that the signals D9 and $\overline{D9}$ are low and high level signals respectively. These signals are supplied to gates 437 and 438 respectively, to be gated with signals M5 and $\overline{M5}$ respectively. Therefore, gate 437 produces a high level output signal CP9A and gate 438 produces a low level output signal CP9B in response to the inputs applied thereto. The application of high level signal CP9A and the low level signal CP9B to gate 449 produces the low level output signal CP9. CP9 along with signals CP1–8 is fed to parity checker 110 in order to determine whether or not the parity of the information compared is correct. The detailed operation of the parity checker is described subsequently.

It will be seen, that each of the signals produced by the circuit namely, CP1–CP9 is a low level signal. Clearly, this situation exists only when the digit supplied by the code drum register 102 is identical with the information supplied by the memory circuit 108. As has been previously shown by the description of the circuit during the numeric mode of operation, if any of the bits in the digit supplied by the code drum register 102 differs from the corresponding bit in the digits supplied serially by the buffer register 106, one of the signals CP–1 to CP–8 will be a high level signal. This will cause the signal CP to be a high level signal which is indicative of a mismatch in the bits of the respective digits and the associated core in 65 bit storage 116 will not be set.

A further comment should be made regarding the operation of the circuit. The signal CP9 which is generated as the check bit may sometimes appear to be incorrect. However, as will be seen in the description of the parity checker 110, this is not the case and the apparently erroneous CP9 signals are, in fact, utilized to determine the accuracy of parity. An example of this type of "apparent error" is described. Assume the code word 1–1011–0111 is being operated upon. It will be seen that each of the four bit subdigits (1011 and 0111) has ODD parity. Clearly, the fifth bit in each case is a binary zero which is gated with the ninth bit of the digit supplied by the code drum register 102 which is a binary one. The subsequent gating operation will produce two high level CP9 signals and the signals CP9A and CP9B will be low level signals for each gating operation. However, the signals CP9 and CP9A or CP9B are not supplied to gates 400, 406 or 404 to determine the polarity or level of signal CP but are supplied to the parity checker 110 to determine the accuracy of the system parity. Therefore, if bits 1–8 from the code drum register match with the eight bits comprising bits 1–4 of each of the two series digits supplied by the buffer register 106, signal CP will be a low level signal indicative of a match. Thus, signal CP9 is primarily important in the parity investigation as will be seen subsequently and the apparent error is quite immaterial in the CP signal generation.

Detailed description of parity checker

Reference is now made to FIGURE 5 wherein the detailed operation of the parity checker 110 in the numeric mode is described. As in the case of the comparator 100, the numeric mode of operation of the parity checker utilizes only the LSD portion of the circuit. The inputs to the first bank of gates 501–506, are obtained from various points in the comparator 100. Moreover, the gates 501–506 are divided into two groups according to the description of FIGURE 3. The first group contains gates 501, 502, 503 and 504; the second group contains gates 505 and 506. The inputs to these gates are arranged such that the output signal PCE1 from the parity checker 110 will be high only if there is an error in the parity of the digit which results from the comparisons by comparator 100. This error will indicate that the digit checked has an EVEN parity or in other words, the number of binary ones is even. Each of the gate groups is designed to produce a high level output signal if the parity of the bits checked thereby is EVEN and to produce a low level output signal if the parity of the bits checked thereby is ODD. The output signals of these gates are also gated together. In the event that the parity of the bits checked by gates 501–504 is EVEN, thereby producing a high level output signal; and the parity of the bits checked by gates 505 and 506 is EVEN, again producing a high level output signal, the high level output signals will be gated together and ultimately produce a high level output signal at gate 500. This high level output signal PCE1 indicates that there is an error in the parity of the digit being checked.

It is clear that one group of gates should produce a high level output signal in response to EVEN parity being applied thereto, and the other group of gates should produce a low level output signal in response to the input signals applied thereto having an ODD parity in order that no error be indicated. This may be shown by the following truth table:

| Parity of Bits Applied To: Gates 501–504: Gates 505–506 | Signal |
| --- | --- |
| ODD . ODD | PCE1 |
| EVEN . EVEN | PCE1 |
| ODD . EVEN | $\overline{PCE1}$ |
| EVEN . ODD | $\overline{PCE1}$ |

Where $\overline{PCE1}$ represents signals (or information in the form of no signals) from gate 500 and is indicative of proper parity in the digit being checked. Conversely, a PCE1 signal is indicative of an error in the parity of the digit being checked. The PCE1 signal may be, for example, a high level signal and the $\overline{PCE1}$ signal may be a low level signal. Thus, it may be said that the signal from gate 500 will be a high level signal (PCE1) if there is an error in the parity of the digit being checked, and the signal produced by gate 500 will be a low level signal ($\overline{PCE1}$) if there is no error in the parity of the digit being checked.

The signals applied to gates 505 and 506 are the signals which are generated by the logic paths which are connected to comparator gates 414 and 415 (see FIGURE 4). These signals comprise signals CP4 and CP9 which are produced by gates 444 and 449, respectively, and are applied to gate 505, and signals CP4A, CP4B, CP9A and CP9B which are produced by the logic path coupled to gates 414 and 415 and are applied to gate 506.

The input signals applied to gates 501–504 are signals which are generated in the logic paths connected to gates 411–413. The signals produced by the logic paths connected to gates 411–413 include signals CP1–3 and the associated A and B signals. Thus gate 501 has applied thereto signals CP2, CP3 and CP1A and CP1B; gate 502 has applied thereto signals CP1, CP2, and CP3A and CP3B; gate 503 has applied thereto signals CP1, CP3 and CP2A and CP2B; gate 504 has applied thereto all six of the A and B signals related to signals CP1–3. Thus, the outputs from the gates 501–506 are gated together in accordance with the Boolean algebra principles supra thereby utilizing the information contained in their respective output signals. Gates 501–504 each have their outputs applied to the inputs of gate 561. The outputs of gates 505 and 506 are applied to the inputs of gate 562. In addition, the outputs from each of gates 501–506 are applied to the inputs of gate 563.

In addition to an input being supplied by each of gates 501–506, gate 563 has the input signal COSTA applied thereto. Thus, the operation of gate 563 is controlled by the control signal COSTA in order to preserve proper timing and phasing relationships among the signals.

The outputs of gates 561 and 562 are fed to the inputs of gate 564. Gates 564 also has applied thereto the control signal COSTA which controls the operation of this gate. The output of gate 564 provides the signal PCEC which is fed to gates 566 and 567 which produce the signals PCE2 and PCE3, respectively. However, these gates relate primarily to the alphameric mode of operation and will be described subsequently.

Similarly, the output of gate 563 provides signal PCEB. The function of this signal is to help determine the polarity or level of signals PCE2 and PCE3 and it is applied to gates 566 and 567, similar to signal PCEC.

In addition, the outputs of gates 563 and 564 are gated together in gate 565. The output signal K7 produced by gate 565 is fed to an input of gate 500. Other inputs to gate 500 include input PCEA which is the output of gate 568. It should be noted that signal PCEA is normally a low level signal which becomes high only when directed to do so by the signals generated during the alphameric mode of operation. However, in the numeric mode of operation, PCEA is not used and is relatively unimportant.

To illustrate the operation of the parity checker 110 in the numeric mode of operation the example utilized in describing the comparator 100 will be utilized again. Thus, it will be assumed that the input signal from the memory circuit 108 to the comparator 01101, and the input signal from the code drum 104 to the comparator 100 is 000001101. By following the operation of the various gates, etc., of the comparator in FIGURES 2 and 4, the signals applied to the inputs of the parity checker 110 may be ascertained. For example, the input signals applied to gate 505 are, as previously described, generated by the logic paths associated with gates 414 and 415. These signals are signals CP4 and CP9, respectively. Since there is a match of compared digits the comparison digit (CP1–8) and the check bit (CP9) comprise only low level signals. Therefore, signals CP4 and CP9 are low level signals as shown by the example. The application of these two low level signals to gate 505 produces a high level signal at the output of the gate. This high level output signal is then fed to inputs of gates 562 and 563. The application of a high level signal to these gates, therefore, clearly permits the generation of only low level output signals therefrom. These low level signals K5 and PCEB respectively are then applied to inputs of gates 564 and 565. (By tracing backward from the output of gate 500, the signals which are necessary at gates 564 and 565 to produce a particular output may be determined whereby much of the signal tracing through the circuit may be eliminated.) Since an illustrative example has been selected in which the parity is clearly a correct parity, the signal $\overline{PCE1}$ must be produced. In order that a low level signal is generated by gate 500, the input signals applied thereto must include at least one high level signal.

The signal PCEA has already been described as a normally low level signal when the circuit is operating in the numeric mode. Therefore, the signal K7 which is generated by gate 565 must be a high level signal since it is the only other input applied to gate 500. Gate 565 provides the high level signal necessary to insure that gate 500 generates a low level signal *only* if each of the inputs applied to gate 565 is a low level signal. That is, the signal PCEC generated and supplied by gate 564 must be a low level signal and, similarly, the signal PCEB generated and supplied by gate 563 must also be a low level signal.

Clearly, in order that each of gates 563 and 564 produce a low level signal, at least one high level input must be applied at each gate. As shown supra, gate 562 produces a low level output signal K5 since at least one of its inputs (from gate 505) is a high level signal. Therefore, in order for gate 564 to generate a low level signal, the input signal supplied by gate 561 must be a high level signal. Moreover, each of the inputs to gate 561 must, therefore, be low level signals. Clearly this will be the case since at least one of the paired A and B signals must be a high level signal (in a correct parity and matched case) and, moreover, each gate (501-504) has an associated signal pair applied thereto. By referring to FIGURE 4, it will be seen that the comparison of the illustrative digits produces a high level signal at each of the associated gate pairs. That is, since the A and B signals are complements, at least one of these signals must be a high level signal. Moreover, in view of the application of a related A and B signal pair to each of gates 501-504 each of these gates will provide low level signals whereby gate 561 must always produce a high level signal.

Similarly, in order to obtain a low level PCEB signal which is applied to an input of gate 565, at least one of the input signals applied to gate 563 must be a high level signal. The high level input signal is supplied by gate 505 since all of its input signals are low level signals. (These low level signals exist in the case of compared digits as defined supra.) Moreover, this high level signal produced by gate 505 is applied at an input of gate 562. Consequently, it is clearly shown that each of gates 562 and 563 must produce a low level output signal.

It has been shown that each of the inputs applied to gate 561 is a low level signal, whereby a high level input signal is provided at gate 564. Therefore, as described above, gate 564 produces a low level signal PCEC which is gated with the low level signal PCEB produced by gate 563 such that gate 565 produces a high level signal to insure the signal $\overline{PCE1}$ (or low level signal PCE1) being produced by gate 500.

Therefore, it has been shown that a low level signal ($\overline{PCE1}$) will be generated when the parity of both digits being compared by comparator 100 is ODD. Moreover, this no-error indication is also an indication of the parity of the digit which was constructed by the signals CP1, CP2, CP3, CP4, and CP9, where a low level signal would be construed to be a binary one and a high level signal would be construed to be a binary zero. In this situation, each of the signals CP1, CP2, CP3, CP4 and CP9 are low level signals and would represent a binary digit 11111. Obviously, this digit has ODD parity.

The output signal PCE1 from gate 500 is applied to an error detection circuit 118 which deactivates (or prevents activation of) the printer mechanism. For example, the signal PCE1 may be fed to error flip-flop 348 via gate 344 (see FIGURE 3). In response to the level of the signal PCE1, the error flip-flop will assume one or the other of its bistable states, and operates as described in conjunction with FIGURE 3.

Clearly, alternatives to this arrangement may be made by requiring that the error flip-flop be "set" to inhibit the automatic activation of the printer mechanism 112. Conversely, the requirement may be made that the error flip-flop be "reset" in order to permit the printer mechanism to be selectively activated. However, this choice of operation is not an integral portion of the present invention and may actually be determined externally of the subject circuit by suitable gating or the like.

Still referring to FIG. 5, the detailed operation of the parity checker 110 in the alphameric mode is described. As in the case of comparator 100, the MSD information is first applied to the MSD portion of the circuit. That is, the signals CP5-CP9 (including A and B signals) are applied to input gates 580-585. From the general description of the operation of the parity checker in FIGURE 3, it will be seen that the outputs from gates 580-585 will be applied to gates 586-588 (similar to gates 561-563 in the LSD circuit described supra). The outputs from gates 586 and 587 are applied to inputs of gate 591, the output of which is applied to gate 589 along with the output of gate 588. The output of gate 589 is fed to check-bit compensating flip-flop 592 and the operation of the parity checker is, thereafter, similar to that described in relation to FIGURE 3.

Continuing with the example used in describing the alphameric operation of the comparator 100 in FIGURE 4, the signals CP5-9 (including A and B signals) are applied to gates 580-585. Since the MSD information digit 11001 (including check bit) is supplied by both the buffer register 106 and the code drum register 102, the signals CP5-9 are all binary ones. The other signals CP5A, CP5B, etc. through CP9B are dependent upon the level or polarity of the particular bits in the digit. That is, if the bits being compared are both binary ones, then the "A" signal is a binary zero or high level signal, and the "B" signal (actually the result of comparison of the two complement signals—viz. two binary zeros) is a binary one or low level signal. Therefore, in view of the MSD information comprising the aforementioned digit 11001, the signals CP5A, CP6B, CP7B, CP8A and CP9A are high level signals or binary zeros. In addition, the signals CP5B, CP6A, CP7A, CP8B and CP9B are low level signals or binary ones.

The output signals from gates 580-585 are, of course, dependent upon the input signals. Consequently, gates 580-583 and 585 each produce a low level output and gate 584 produces a high level signal. This is easily seen when it is noted that gate 584 has two low level signals CP8 and CP9 applied thereto. Gate 580 has applied to the inputs thereof the signals CP5A, CP5B, CP6 and CP7, of which, signal CP5A is a high level signal. Gate 581 has applied thereto signals CP5, CP6, CP7A and CP7B, of which, signal CP7B is a high level signal. Gate 582 has applied thereto the signals CP5, CP7, CP6A and CP6B, the last of which is a high level signal. Gate 583 has as its inputs the signals CP5A, CP5B, CP6A, CP6B, CP7A and CP7B. In this case the signals CP5A, CP6B and CP7B are all high level signals. Gate 585 has applied thereto signals CP8A, CP8B, CP9A and CP9B. Of these signals, signals CP8A and CP9A are high level signals.

The output signals from gates 580-585 are then applied to gates 586, 587 and 588 according to the Boolean algebra discussed in reference to FIG. 3. Thus, gate 586 has applied thereto the output signals from gates 580-583, each of which is a low level signal. Consequently, gate 586 produces a high level output signal. Gate 587 has applied thereto the output signals from gates 584 and 585. Gate 587 produces a low level signal since gate 584 produces a high level signal. Gate 588 has the output signals from each of gates 580-585 applied thereto. Again, since gate 584 produces a high level signal, gate 588 produces a low level signal. Gate 588 in FIGURE 5 corresponds to gate 324 in FIGURE 3. Thus, it will be seen that control signals must be applied to gate 588 in order that gate 588 may be rendered operative to produce the low level output signal.

The low level output signal produced by gate 588 is applied to one input of gate 589. Another input signal to gate 589 is supplied by gate 591. Gate 591 has applied thereto the low level signal produced by gate 587 signal produced by gate 586. In addition, 591 has control signals applied to inputs thereof which control signals control the operability of the gate. These control signals are similar to those applied to gate 588. Therefore, these gates supply their output signals simultaneously. (In addition, these gates supply their output signals at a time prior to the LSD circuit portion.) Clearly, the simultaneity of operation of 588 and 591 is desirable in order that gate 591 properly produce its output signal.

Since gate 591 has at least plied by flip-flop 592 and the signals D9 and $\overline{D9}$ plied by code drum register 102.

Referring back to flip-flop 102, view of the correct exam the signals ME respecti Receiving back to flip-flop 592 and the signals D9 and $\overline{D9}$ parison digit (i.e. having ODD parity) signals PCE2, PCE3 and previously described PCE1 will all be low level signals. The application of all low level signals to gate 344 will assure that signal applied to flip-flop 348 will not produce an error signal.

The gates 566 and 567 have an especial function in producing an error signal in the situation previously described where a high level signal PCEA has blocked gate 500 and prevents the production of an error signal PCE1. Thus, for example, if the MSD information is EVEN (with D9) or ODD (with $\overline{D9}$), gate 500 is prevented from producing error signal PCE1. Therefore, one of the signals PCE2 or PCE3 must be produced if there is, in fact, an error. That is, an error exists when the LSD intermediate signals PCEB and/or PCEC indicate ODD parity. This condition is indicated by low level signals being produced by gates 563 or 564. These signals are then applied to gates 566 and 567. The operation of these gates is believed to be readily apparent with regard to the production of the respective output signals. The signals PCE1, PCE2 and PCE3 are then applied to error flip-flop 348 via gate 344 (see FIGURE 3) in order to produce an error signal, if required.

It has, thus, been shown that an information digit in bi-quinary form and using binary symbols, that is ones and zeros from one source may be compared with a similary coded information digit from another source to determine, first, by comparison, the existence or lack thereof of identity between the two digits and, second, by sampling the results of the comparison process and using the principles of Boolean algebra, the parity of the information. More particularly, the comparison operation can produce a digit wherein a certain coded symbol, for example a binary one, may represent a match of corresponding bits and binary zero may show a mismatch of the corresponding bits. By sampling the digit made up of these resultant symbols (viz. ones and zeros) the parity of the resultant digit can be checked by determining the ODD-EVEN number of any of either of the symbols. This thereby gives pertinent information regarding the two basic information digits.

Having thus described the invention what is claimed is:

1. A system for checking coded information comprising, first means for receiving coded information from a first source, second means for receiving coded information from a second source, comparator means, said first and second means being coupled to said comparator means to produce further coded information which is indicative of the relationship between the coded information received from said first and second sources, first output means coupled to said comparator means, means for sampling said further information in accordance with Boolean algebra principles to determine the parity of said further information, said last named means being coupled to said comparator means, and second output means connected to said last named means to produce a signal which indicates whether or not said parity is ODD.

2. In an information checking system, means for comparing a first information signal with certain portions of a standard information signal, means for producing a first comparison digit in accordance with the comparison performed by said comparing means, means for comparing a second information signal with certain portions of said standard information signal, said certain portions of said standard information signal utilized by said second comparison being partly coincident with said certain portion utilized by said first comparison such that all portions of said standard information signal are compared, means for producing a second comparison digit in accordance with the comparison performed by said comparing means, means for checking the parity of the comparison digit produced by said first comparison, means for checking the parity of the comparison digit produced by said second comparison, and output means for compiling the information produced by said checking means in order to indicate any error therein.

3. An infomation checking system comprising first means for receiving digital information from an information storage means, second means for receiving digital information from an information producing means, said first and second means being coupled together to produce further digital information which is indicative of the relationship between the information received from said first and second sources, means for sampling said further information by a parity bit check circuit in order to determine the parity of said further information, and output means adapted to produce a signal in accordance with the determination of said sampling means.

4. A system for checking coded information comprising, a first plurality of gate means for receiving coded information, a first source for supplying coded information to said gate means, a second source for supplying coded information to said gate means, said gate means being operative to produce further coded information which is indicative of the relative identity between the coded information received from said first and second sources, a second plurality of gate means, said second gate means being adapted for sampling said further information to determine the parity of said further information, and output means adapted to produce a signal which indicates whether or not said parity is ODD.

5. In an information checking system, means for serially producing first and second information digits, means for producing a coded reference digit, means for comparing said first information digit with certain portions of said coded reference digit, means for producing a first comparison digit in accordance with the comparison performed by said comparing means, further means for comparing said second information digit with certain portions of said coded reference digit, said certain portions of said coded reference digit utilized by said second comparison being partly coincident with said certain portions utilized by said first comparison such that all portions of said coded reference signal are compared with said information digits, further means for producing a second comparison digit in accordance with the comparison performed by said further comparing means, each of said comparison digits comprising information in a binary form such that a match of associated digit portions produces a "one" and a mismatch of said associated portions produces a zero, means for checking the ODD-EVEN parity of said first comparison digit, means for checking the ODD-EVEN parity of said second comparison digit, and output means for compiling the information produced by said parity checking means in order to indicate any error therein.

6. In a system for checking information which is in the binary-digital form, first means for receiving binary-digital information from a first source, second means for receiving binay-digital information from a second source, said first and second means being coupled together to produce further binary-digital information which is indicative of the bit-by-bit relationship between the information received from said first and second sources, said further binary-digital information following the code that a "one" represents a match of corresponding bits and a "zero" represents a mismatch of corresponding bits, means for sampling said further information in accordance with Boolean algebra principles to determine the number of binary "ones" included in said further information, and output means adapted to produce a signal which indicates whether or not said number is ODD.

7. A digital information sampling system comprising, means for comparing a plurality of digital input signals on a bit-by-bit basis, said comparing means being operative to produce a single digital output signal utilizing a code having binary ones and zeroes, said binary ones indicating a match of the compared bits and said binary zeroes indicating a mismatch of the compared bits, means for checking said digital output signal to determine if the number of binary ones is odd, said checking means being operative to produce a first error signal if the number of ones is not odd, and means for interpreting said output signal to determine if there are any binary zeroes in said single digital output signal, said means being operative to produce a second error signal if any zeroes are detected, said first and second error signals being applied to separate control circuits.

8. In an information checking system selectively capable of two different modes of operation, first means adapted for operation in each of the first and second modes for comparing a first information signal with certain portions of a standard information signal, means for producing a first comparison digit in accordance with the comparison performed by said first comparing means in said first mode and second modes, second means adapted for operation only in the second of said modes for comparing a second information signal with certain portions of said standard information signal, said certain portions of said standard information signal utilized by said second comparison being partly coincident with said certain portions utilized by said first comparison in said second mode such that all portions of said standard information signal are compared during said second mode of operation, means for producing a second comparison digit in accordance with the comparison performed by said first and second comparison means in said second mode, first means for checking the parity of the signal produced only by said first comparison, second means for checking the parity of the signal produced by said second comparison, and ouptut means for selectively sampling the information produced by one of said first and second checking means during the associated mode of operation in order to indicate any error therein.

9. In an information checking system, first gating means for comparing all of the binary bits of a first information digit with certain binary bits of a standard information digit, second gating means for producing a comparison digit in accordance with the comparison performed by said first gating means, third gating means for checking the parity of the comparison produced by said first comparison, and output gating means adapted for receiving the information produced by said checking means in order to indicate any error therein.

10. A signal checking system comprising, a comparator circuit, said comparator comprising a first plurality of gates, each of said first gates operating as an AND gate for low level signals, a first input source, a second input source, said first and second input sources supplying information signals to said comparator, said information signals being in the form of binary digital signals, said comparator being adapted to produce an output signal in accordance with the similarity of the input signals applied thereto, a parity checking circuit, said parity checker comprising a second plurality of gates, each of said second gates operating as an AND gate for low level signals, said parity checker being adapted to operate upon said output signal produced by said comparator circuit whereby the ODD·EVEN parity of said output signal is determined, and an error detection circuit, said error detection circuit comprising a third plurality of gates, each of said third gates operating as an AND gate for low level signals, said error detection circuit being adapted to produce an output signal whenever either said comparator circuit or said parity checker produces an improper signal.

11. A signal checking system comprising, a comparator circuit, said comparator comprising a first plurality of gates, a first input source, a second input source, said first and second input sources being connected to said comparator circuit and supplying information signals thereto, said comparator being adapted to produce an output signal in accordance with the similarity of the input signals applied thereto, a parity checker circuit, said parity checker being connected to the output of said comparator circuit and comprising a second plurality of gates, said parity checker being adapted to operate upon said output signal produced by said comparator circuit whereby the ODD·EVEN parity of said output signal is determined, and an error detection circuit, said error detection circuit connected to said parity checker and comprising a third plurality of gates, said error detection circuit being adapted to produce an output signal whenever said comparator circuit or said parity checker produces an improper signal, said error detection circuit including delay means so that different portions of said output signal may be produced by said comparator and operated upon by said parity checker at different times.

12. In a signal checking system comprising, a comparator circuit comprising a plurality of gates, first and second input sources for supplying information signals to said comparator, said information signals being in the form of binary digital signals, said comparator adapted to produce a binary output digit in accordance with the bit-by-bit similarity of the input signals applied thereto, a parity checker circuit comprising a plurality of gates, said parity checker adapted to operate upon said output digit produced by said comparator circuit whereby the ODD·EVEN parity of said output digit is determined, an error detection circuit comprising a plurality of gates and delay elements, said error detection circuit adapted to temporarily store intermediate signals produced by said comparator and said parity checker and to produce a signal whenever said comparator circuit or said parity checker produces an improper signal after a complete operation, and output means for sensing the signal produced by said error detection circuit, said output means producing a signal which initiates a predetermined control function.

References Cited by the Examiner

UNITED STATES PATENTS

| | | | |
|---|---|---|---|
| Re. 23,601 | 12/1952 | Hamming et al. | 340—147 |
| 2,857,100 | 10/1958 | Franck et al. | 340—147 |
| 2,892,888 | 6/1959 | James et al. | 178—23.1 |
| 2,959,351 | 11/1960 | Hamilton et al. | 340—172.5 X |
| 3,008,129 | 11/1961 | Katz | 340—146.2 |
| 3,111,578 | 11/1963 | Gerrand et al. | 235—177 |

ROBERT C. BAILEY, *Primary Examiner.*

NEIL C. READ, IRVING L. SRAGOW, MALCOLM A. MORRISON, *Examiners.*

L. S. GRODBERG, M. J. SPIVAK, *Assistant Examiners.*